United States Patent
Bradshaw et al.

(10) Patent No.: US 9,934,240 B2
(45) Date of Patent: Apr. 3, 2018

(54) ON DEMAND ACCESS TO CLIENT CACHED FILES

(75) Inventors: Peter Bradshaw, San Francisco, CA (US); Ryan Tyler Cairns, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1368 days.

(21) Appl. No.: 12/242,811

(22) Filed: Sep. 30, 2008

(65) Prior Publication Data

US 2015/0193514 A1 Jul. 9, 2015

(51) Int. Cl.
*G06F 7/00* (2006.01)
*G06F 17/30* (2006.01)

(52) U.S. Cl.
CPC .............. *G06F 17/30174* (2013.01)

(58) Field of Classification Search
CPC ......... G06F 17/30174; G06F 17/30575; G06F 17/3048; G06F 17/30864
USPC ..................... 707/620, 825, 999.1
See application file for complete search history.

(56) References Cited

U.S. PATENT DOCUMENTS

| | | | |
|---|---|---|---|
| 5,675,802 A | 10/1997 | Allen et al. | |
| 5,758,355 A * | 5/1998 | Buchanan | |
| 5,787,413 A * | 7/1998 | Kauffman et al. | |
| 5,870,765 A * | 2/1999 | Bauer et al. | 707/610 |
| 5,944,793 A * | 8/1999 | Islam | H04L 29/06 709/220 |
| 5,978,813 A * | 11/1999 | Foltz et al. | |
| 5,999,947 A * | 12/1999 | Zollinger et al. | |
| 6,061,692 A * | 5/2000 | Thomas | G06F 17/30362 707/613 |
| 6,078,925 A * | 6/2000 | Anderson et al. | 707/784 |
| 6,128,623 A * | 10/2000 | Mattis | G06F 17/30902 707/695 |
| 6,151,624 A * | 11/2000 | Teare | G06F 17/30887 707/999.005 |
| 6,209,003 B1 * | 3/2001 | Mattis | G06F 12/023 |
| 6,289,258 B1 * | 9/2001 | Carter, Jr. | G01F 1/002 700/117 |
| 6,289,358 B1 * | 9/2001 | Mattis et al. | 707/695 |
| 6,311,194 B1 * | 10/2001 | Sheth | G06F 17/30595 707/E17.095 |
| 6,324,544 B1 | 11/2001 | Alam et al. | 707/201 |
| 6,430,576 B1 | 8/2002 | Gates et al. | 707/201 |
| 6,438,563 B1 | 8/2002 | Kawagoe | 707/201 |

(Continued)

OTHER PUBLICATIONS

Challenger et al., "Efficiently serving dynamic data at highly accessed web sites"; IEEE 2004.*

(Continued)

*Primary Examiner* — Daniel Kuddus
(74) *Attorney, Agent, or Firm* — Morgan, Lewis & Bockius LLP

(57) ABSTRACT

Metadata for a set of files in a file system is stored in a client metadata database. In addition, a subset of content for the set of files in the client metadata database is stored in a client content database. The subset of content does not exceed a cache size that is less than a full size of the content in the set of the files. In response to a request, at least a portion of the content that is not already stored in the client content database is retrieved from a server content database, where the server content database is located remotely from the client device.

21 Claims, 12 Drawing Sheets

(56) References Cited

U.S. PATENT DOCUMENTS

| | | | |
|---|---|---|---|
| 6,442,598 B1* | 8/2002 | Wright et al. | 709/217 |
| 6,526,434 B1 | 2/2003 | Carlson et al. | 709/203 |
| 6,611,840 B1* | 8/2003 | Baer et al. | 715/270 |
| 6,697,844 B1* | 2/2004 | Chan et al. | 709/206 |
| 6,757,696 B2 | 6/2004 | Multer et al. | 707/201 |
| 6,757,698 B2* | 6/2004 | McBride et al. | |
| 6,804,674 B2* | 10/2004 | Hsiao et al. | |
| 6,823,360 B2* | 11/2004 | Copeland et al. | 709/203 |
| 6,842,768 B1 | 1/2005 | Shaffer et al. | 709/203 |
| 6,993,522 B2 | 1/2006 | Chen et al. | 707/7 |
| 7,024,429 B2 | 4/2006 | Ngo et al. | 707/201 |
| 7,024,430 B1 | 4/2006 | Ingraham et al. | 707/201 |
| 7,124,151 B1 | 10/2006 | Choi | 707/201 |
| 7,155,465 B2 | 12/2006 | Lee et al. | 707/204 |
| 7,181,731 B2* | 2/2007 | Pace et al. | 717/136 |
| 7,203,708 B2 | 4/2007 | Liu et al. | 707/200 |
| 7,219,134 B2* | 5/2007 | Takeshima | G06F 17/30569 707/E17.006 |
| 7,240,091 B1 | 7/2007 | Hopmann et al. | 709/203 |
| 7,293,049 B2 | 11/2007 | Kadyk et al. | 707/204 |
| 7,315,978 B2 | 1/2008 | Giles | 715/500.1 |
| 7,359,955 B2* | 4/2008 | Menon et al. | 709/219 |
| 7,395,394 B2* | 7/2008 | Federa et al. | 711/163 |
| 7,475,155 B2* | 1/2009 | Stern et al. | 709/231 |
| 7,506,019 B2* | 3/2009 | Stern et al. | 709/200 |
| 7,539,780 B2* | 5/2009 | Makhervaks et al. | 709/250 |
| 8,999,947 B2* | 4/2015 | Mirkin | A61K 9/5115 514/44 R |
| 2002/0019935 A1 | 2/2002 | Andrew et al. | |
| 2002/0069192 A1 | 6/2002 | Aegerter | 707/1 |
| 2002/0069218 A1* | 6/2002 | Sull | G06F 17/30796 715/202 |
| 2002/0124098 A1* | 9/2002 | Shaw | 709/231 |
| 2002/0194205 A1 | 12/2002 | Brown et al. | |
| 2003/0086700 A1 | 5/2003 | Yamagami | |
| 2003/0145020 A1* | 7/2003 | Ngo et al. | 707/201 |
| 2004/0054779 A1* | 3/2004 | Takeshima | G06F 17/30569 709/225 |
| 2004/0122870 A1 | 6/2004 | Park et al. | 707/201 |
| 2004/0128292 A1 | 7/2004 | Kinnell | |
| 2004/0128556 A1 | 7/2004 | Burnett | |
| 2004/0202348 A1 | 10/2004 | Kuzma | |
| 2004/0243644 A1 | 12/2004 | Steere et al. | 707/200 |
| 2005/0086390 A1* | 4/2005 | Banerjee et al. | 709/250 |
| 2005/0102328 A1 | 5/2005 | Ring et al. | |
| 2005/0114711 A1* | 5/2005 | Hesselink | H04L 63/0209 726/4 |
| 2005/0177617 A1 | 8/2005 | Banginwar et al. | 709/203 |
| 2005/0203962 A1 | 9/2005 | Zhou et al. | 707/200 |
| 2005/0216524 A1 | 9/2005 | Gomes et al. | 707/201 |
| 2005/0256907 A1 | 11/2005 | Novik et al. | 707/200 |
| 2006/0004765 A1* | 1/2006 | Anderson | G06F 17/30067 |
| 2006/0010130 A1 | 1/2006 | Leff et al. | |
| 2006/0015539 A1* | 1/2006 | Wolf et al. | 707/201 |
| 2006/0031264 A1 | 2/2006 | Bosworth et al. | 707/200 |
| 2006/0041596 A1 | 2/2006 | Stirbu et al. | 707/200 |
| 2006/0059208 A1 | 3/2006 | Chen et al. | |
| 2006/0080353 A1* | 4/2006 | Miloushev et al. | 707/102 |
| 2006/0106879 A1 | 5/2006 | Zondervan et al. | 707/200 |
| 2006/0123010 A1 | 6/2006 | Landry et al. | |
| 2006/0136511 A1 | 6/2006 | Ngo et al. | 707/203 |
| 2006/0155945 A1 | 7/2006 | McGarvey | |
| 2006/0242444 A1 | 10/2006 | Novik et al. | |
| 2007/0043715 A1 | 2/2007 | Kaushik et al. | |
| 2007/0073766 A1 | 3/2007 | Porter | |
| 2008/0046476 A1 | 2/2008 | Anderson et al. | |
| 2008/0133618 A1 | 6/2008 | Kawabe et al. | |
| 2008/0133922 A1 | 6/2008 | Williams | |
| 2008/0162944 A1 | 7/2008 | Suzuki | |
| 2009/0307277 A1 | 12/2009 | Grubov et al. | |

OTHER PUBLICATIONS

Office Action dated Aug. 17, 2009 for related U.S. Appl. No. 11/323,199.

Office Action dated Jan. 8, 2008 for related U.S. Appl. No. 11/323,199.

Office Action dated Jul. 29, 2008 for related U.S. Appl. No. 11/323,199.

Office Action dated Feb. 17, 2009 for related U.S. Appl. No. 11/323,199.

Braginsky, Notice of Allowance, U.S. Appl. No. 12/435,317, dated Jul. 13, 2012, 11 pgs.

Braginsky, Examiner's Answer, U.S. Appl. No. 11/323,199, dated Mar. 29, 2011, 32 pgs.

Braginsky, Notice of Allowance, U.S. Appl. No. 11/323,198, dated Jan. 8, 2009, 26 pgs.

Braginsky, Office Action, U.S. Appl. No. 11/323,198, dated Jul. 18, 2008, 19 pgs.

Braginsky, Office Action, U.S. Appl. No. 11/323,198, dated Jan. 31, 2008, 19 pgs.

Braginsky, Office Action, U.S. Appl. No. 11/323,199, dated Aug. 9, 2010, 17 pgs.

Braginsky, Office Action, U.S. Appl. No. 11/323,199, dated Jan. 21, 2010, 17 pgs.

Braginsky, Office Action, U.S. Appl. No. 12/435,317, dated May 13, 2011, 42 pgs.

Braginsky, Office Action, U.S. Appl. No. 12/435,317, dated Nov. 17, 2010, 37 pgs.

Braginsky, Office Action, U.S. Appl. No. 12/435,317, dated Nov. 28, 2011, 47 pgs.

Uhrhane, Office Action, U.S. Appl. No. 12/242,818, dated Aug. 3, 2011, 39 pgs.

Braginsky, D., U.S. Appl. No. 12/435,317, Notice of Allowance, dated Mar. 5, 2012, 23 pages.

Uhrhane, E., U.S. Appl. No. 12/242,818, Final Office Action, Notification dated Apr. 19, 2012, 52 pages.

Uhrhane, Final Office Action, U.S. Appl. No. 12/242,818, dated May 23, 2013, 51 pgs.

Braginsky, Office Action, U.S. Appl. No. 13/617,045, dated Jul. 19, 2013, 18 pgs.

Uhrhane, Notice of Allowance, U.S. Appl. No. 12/242,818, dated Sep. 13, 2013, 20 pgs.

Braginsky, Final Office Action, U.S. Appl. No. 13/617,045, dated Dec. 16, 2013, 18 pgs.

Braginsky, Office Action, U.S. Appl. No. 13/617,045, dated Sep. 22, 2014, 14 pgs.

* cited by examiner

ON DEMAND ACCESS TO CLIENT CACHED FILES

RELATED APPLICATIONS

This application is related to U.S. patent application Ser. No. 11/323,199, filed Dec. 30, 2005, entitled "Locally Cached File System," which application is incorporated by reference herein in its entirety.

This application is also related to U.S. patent application Ser. No. 11/323,198, filed Dec. 30, 2005, entitled "Conflict Management During Data Object Synchronization Between Client and Server," which application is incorporated by reference herein in its entirety.

TECHNICAL FIELD

The disclosed embodiments relate generally to computer file management and in particular to managing file metadata.

BACKGROUND

Today, most people's computer files (e.g., documents, photos, songs, movies, etc.) and other items (e.g., calendar events, emails, tasks, etc.) exist on one or more personal physical devices (e.g., laptops, desktops, PDAs, mobile phones, etc.). This hinders the management and production of information in a number of ways. For example, access to files is typically not ubiquitous across multiple physical devices. It is generally difficult for a user to walk into an Internet café or grab a friend's computer and view or edit a draft document that was started on a different computer. File synchronization is also difficult if a user works on the same document on multiple devices. To ensure the most current version of a document is available, a user may have to repeatedly email modified versions of the document to himself, or remember to consistently store a copy of the current version on a portable drive (e.g., a USB drive), which are techniques that are prone to errors. This problem is compounded during collaboration where multiple document versions may have to be managed via email or merged manually. Finally, if hard disks fail or a laptop is stolen, valuable information may be lost if the user lacks the know-how or the discipline to back-up data.

Networked file systems for business enterprises solve some, but not all of these file management problems for corporations and institutions who can afford such systems. Few consumers, however, have the ability or patience to create and maintain a network application for themselves and everyone with whom they wish to collaborate.

SUMMARY OF EMBODIMENTS

In one aspect of the embodiments disclosed in this document, metadata for a set of files in a file system is stored in a client metadata database. In addition, a subset of content for the set of files in the client metadata database is stored in a client content database. The subset of content does not exceed a cache size that is less than a full size of the content in the set of the files. In response to a request, at least a portion of the content that is not already stored in the client content database is retrieved from a server content database, where the server content database is located remotely from the client device.

In another aspect of the embodiments disclosed in this document, a system for downloading file content on demand, includes one or more processors, memory, and one or more programs stored in the memory for execution by the one or more processors. The one or more programs include instructions to store in a client metadata database, metadata for a set of files in a file system; to store in a client content database, a subset of content for the set of files in the client metadata database, wherein the subset of content does not exceed a cache size that is less than a full size of the content in the set of the files; and to respond to a request by retrieving from a server content database and storing in the client content database, at least a portion of content not in the subset of content, wherein the server content database is located remotely from the client device.

BRIEF DESCRIPTION OF THE DRAWINGS

Like reference numerals refer to corresponding parts throughout the drawings.

DESCRIPTION OF EMBODIMENTS

Figure 1A:
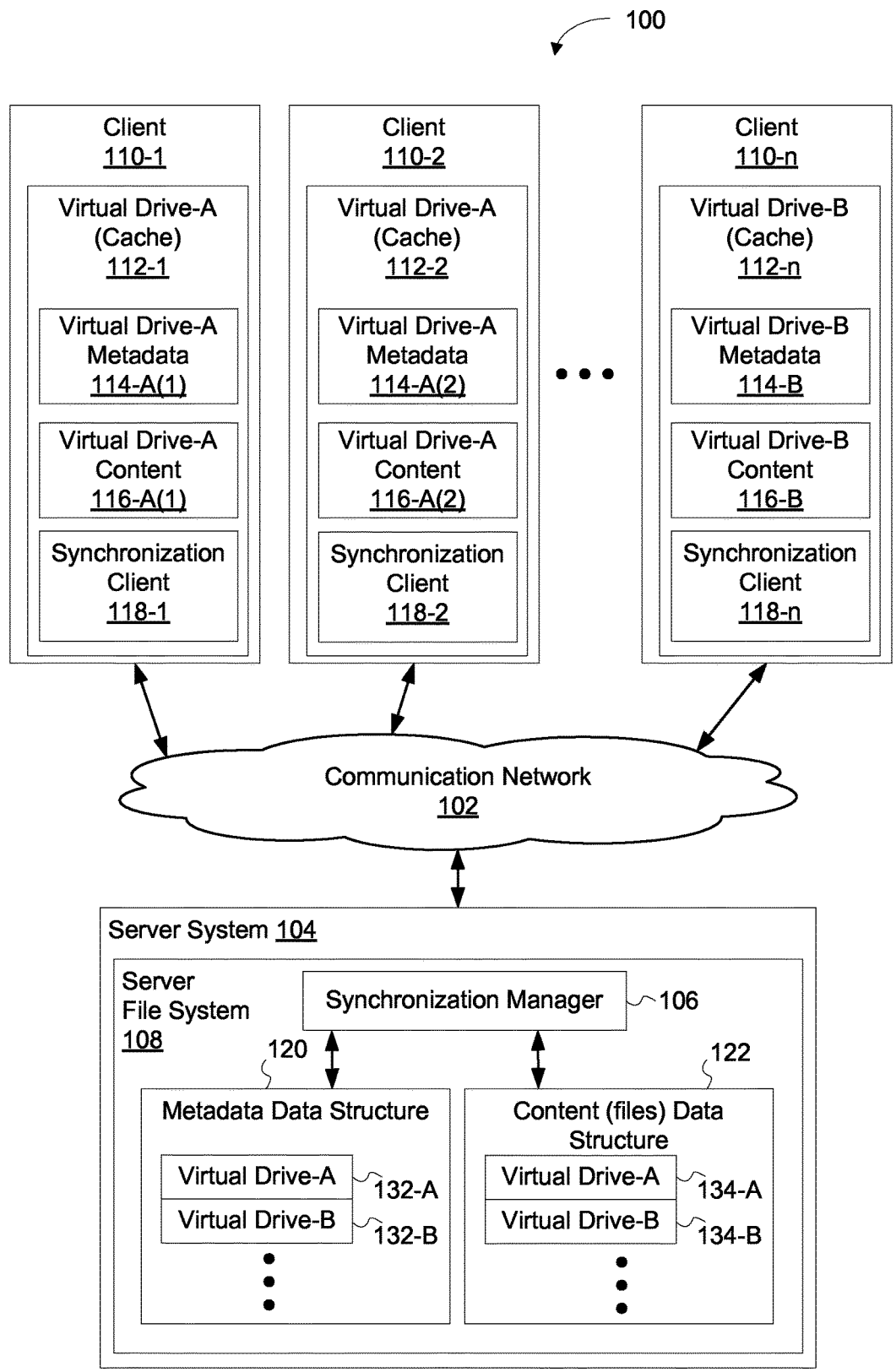
FIG. 1A and FIG. 1B are schematic diagrams of embodiments of a file management system.

FIG. 1 is a schematic diagram of one embodiment of a file management system 100 including several client systems 110 and a server system 104. The one or more client systems 110 (e.g., laptop computer, desktop computer, personal digital assistant (PDA), mobile phone, media player, etc.) are coupled to one or more server systems 104 via a communication network 102. The communication network 102 can be one or more networks having one or more types of topologies, including but not limited to the Internet, intranets, local area networks (LANs), wireless networks, Ethernet, Storage Area Networks (SANs), telephone networks, and the like.

The file management system 100 is not limited to the configuration shown in FIG. 1 but can include more or fewer components. For example, the client systems 110 (sometimes herein called clients or client devices) and server systems 104, would typically include hardware and software components for establishing and maintaining a connection over a network and for communicating and exchanging information with other network devices.

The server system 104 contains a server file system 108. The server file system 108 contains a synchronization manager 106 for synchronizing with the clients 110, as will be explained below. The server file system 108 also contains a metadata structure 120 and a content (files) data structure 122 which contain metadata and content respectively. The metadata data structure 120 contains metadata information for each corresponding client virtual drive that it supports. For example, in FIG. 1, the metadata data structure contains metadata for virtual drive-A 132-A and virtual drive-B 132-B. Similarly, the content data structure 122 contains data or content (sometimes called files) for each client virtual drive that it supports, examples of which are Virtual drive-A 134-A and virtual drive-B 134-B in FIG. 1.

Each client (110-1 though 110-n) contains a virtual drive or cache 112 containing virtual drive metadata 114 and virtual drive content 116. The metadata 114 and content 116 for each virtual drive 112 is synchronized with the server system 104 by means of a synchronization client 118

The components of a client 110 will now be described with reference to one particular client 110-1. The client 110-1 contains virtual drive-A 112-1. In some embodiments, the client 110-1 contains more than one virtual drive 112 (not shown). Virtual drive-A 112-1 is broken into two sub-components, metadata 114-A(1) and file content 116-A(1). Data structures for storing the metadata and file content are discussed in more detail below. A virtual drive-A metadata data structure 114-A(1) contains the metadata for files associated with virtual drive-A 112-1, and virtual drive-A content data structure 116-A(1) contains content for some or all of the files associated with the virtual drive-A 112-1. In some embodiments, the virtual drive-A content data structure 116-A(1) contains only a subset of the content of the files associated with virtual drive-A 112-1.

Both the virtual drive-A metadata data structure 114-A(1) and the virtual drive-A content data structure 116-A(1) are periodically synchronized by means of the synchronization client 118-1. During synchronization metadata 112-1 from the client for virtual drive-A and file content for virtual drive-A are synchronized with the server 104 over the communication network 110. In some embodiments, only a subset of the file content is synchronized. The synchronization client 118-1 of virtual drive-A 112-1 and the synchronization manager 106 of the server system 104 manage this synchronization process. In some embodiments, the synchronization happens asynchronously. When metadata 114-A(1) from virtual drive-A 112-1 is synchronized with the server 104, it is synchronized with a corresponding copy 132-A of the metadata in a metadata data structure 120 stored in the server 104. Similarly, when content from virtual drive-A 116-A(1) is synchronized with the server 104, it is synchronized with a corresponding copy of the content 134-A in a content (e.g., file content) data structure 122 stored in the server 104. When a new file is created at the client 110-1, the new file's metadata and content are stored in the metadata data structure 120 and content data structure 122 of the server system 104 during synchronization.

Virtual drives 112 may be shared across more than one client system 110. For example, a user may wish to have access to the same virtual drive 112 at home, at the office, and on a traveling mobile computing device. FIG. 1 illustrates this concept by showing that virtual drive-A is also located on client 110-2. In client 110-2 virtual drive-A 112-2 contains a local instance 114-A(2) of the virtual drive-A metadata and the virtual drive-A content 116-A(2). In this example, the local instances of virtual drive-A in both clients 110-1 and 110-2 are synchronized against a single set of metadata and content for the virtual drive-A stored in the server. However, for any of a number of reasons, including a client 110 not connected to the network 102, or a client 110 that has not recently synchronized with the server 104, the metadata and/or content of a virtual drive may not be identical across all the clients sharing the same virtual drive.

During metadata synchronization, the synchronization client 118 (of any particular virtual drive on a client) synchronizes metadata with the server system 104 such that the metadata is synchronized with the metadata 132 stored by the server for that virtual drive. Likewise, during content (file) synchronization, the synchronization client 118 synchronizes content with the server system 104 such that the content at the respective client is synchronized with the content 134 stored by the server 104 for the virtual drive. When the virtual drive instance at a client stores less than all the content of the virtual drive, the content synchronization synchronizes (between the client and server) that portion of the content that is stored at the client.

In some embodiments, particular files or directories are accessible by more than one user rather than sharing entire virtual drives. If an owner of a file shares it with other users of the file management system 100, then more than one client may have access to the same file at the same time. Conflicts between file updates are discussed in U.S. patent application Ser. No. 11/323,198, filed Dec. 30, 2005, entitled "Conflict Management During Data Object Synchronization Between Client and Server". In some embodiments, the metadata for a respective file or directory includes data representing any access permissions associated with the file or directory, thereby indicating which users (other than the owner of the virtual drive in which the file or directory is located), if any, have permission to access the file or directory.

Many clients can be a part of the file management system 100. Some clients will have separate virtual drives. This is illustrated in FIG. 1 in that client 110-n contains virtual drive-B 112-n. Virtual drive-B 112-n has the same general structure as the virtual drives in client 110-1 and client 110-2, including metadata 114-B, content 116-B, and a synchronization client 118-n. When client 110-n synchronizes over the communication network 102 with the server 104 using the server synchronization manager 106, the virtual drive-B content 116-B and the virtual drive-B metadata 114-B are synchronized with the server's 104 corresponding virtual drive-B. Specifically, client 110-n's virtual drive-B content 116-B will be synchronized with virtual drive-B 134-B content (files) 122, and client 110-n's virtual drive-B metadata 114-B will be synchronized with virtual drive-B 134-B metadata 120.

A user can manage files on the client system 110 using the virtual drive 112. File management includes all the various operations typically associated with files, including but not limited to creating, deleting, opening, editing, moving, copying, renaming, saving, searching and the like. Files can include any known data structures or formats, including but not limited to text files, documents, digital images, video files, web pages, emails, applications, instant messages, audio files, video files, calendar events, music files, or any other data or applications that may reside on one or more computer systems. The virtual drive can have any topology or configuration, including but not limited to the ubiquitous hierarchal directory/folder/file architectures used by WINDOWS, LINUX, MAC OS and UNIX operating systems. As noted above, the virtual drive 112 is synchronized with the server system 104 to receive updates and other information. In some embodiments, the updates and other information include changes to the content of a respective file or the metadata of the file made by another user (e.g., at another client 110) with access to the file.

Files in the virtual drive 112 are typically utilized by an application that is installed on the client system 110. In some embodiments, the virtual drive 112 is installed on the client system 110 and is integrated into the native file system to provide all the functionality of a local physical hard drive.

Figure 1B:
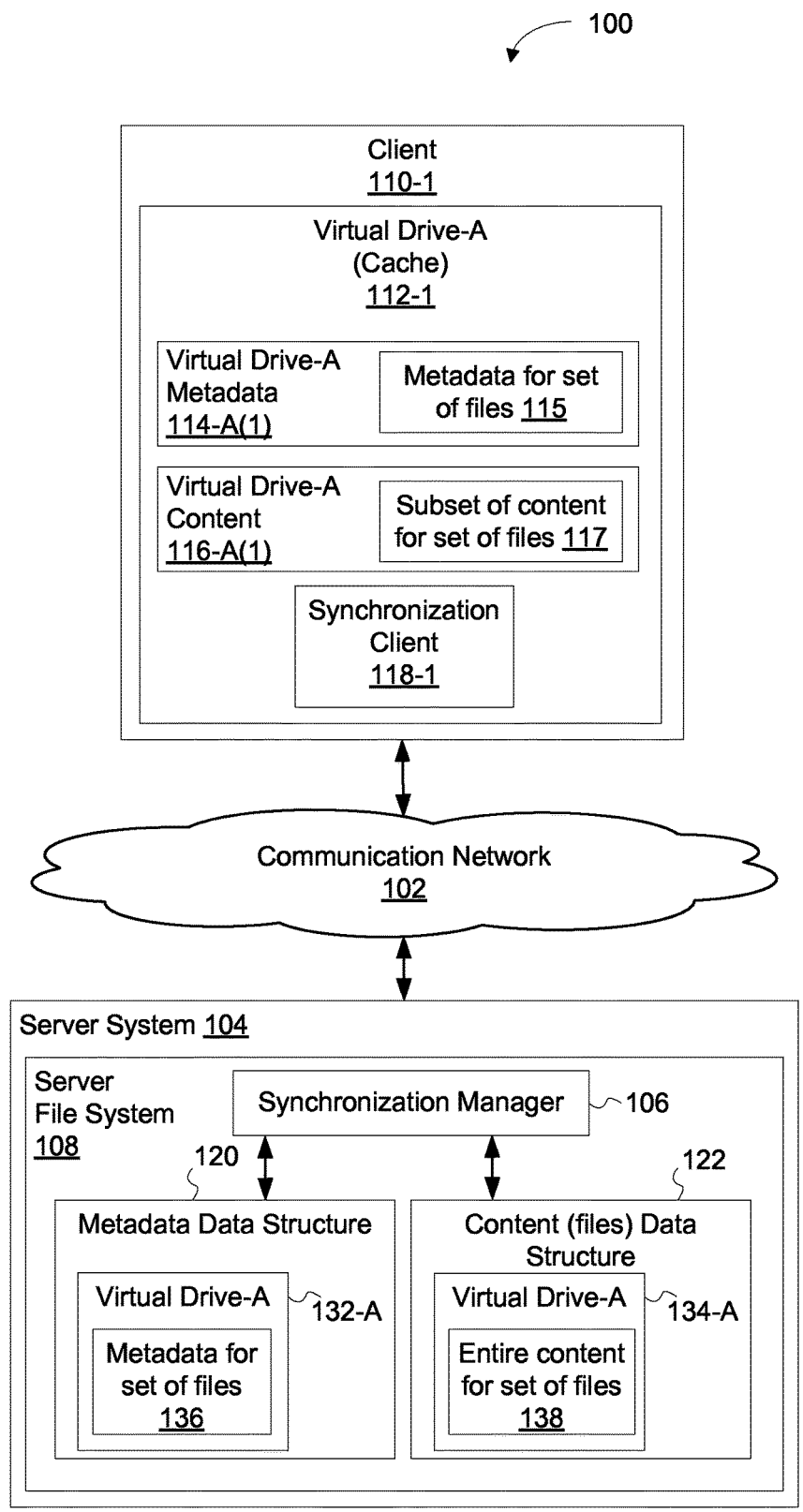

FIG. 1B shows more detail regarding a respective client 110-1 in the system of FIG. 1A. In some embodiments, the virtual drive metadata structure 114-A(1) contains all of the metadata for each file in its set of files 115, while the virtual drive content structure 116-A(1) contains a subset of content 117 for the set of files in the metadata structure. In some embodiments, the subset of content 117 includes at least some content for each file in the set of files 115 for which metadata is stored. Alternately, the subset of content 117 consists of content for a subset of files of the set of files 115 for which metadata is stored. However, the server system 104 stores all of the metadata and all of the content for the set of files. Specifically, metadata for the set of files 136 is stored in the server metadata structure 120, and the entire content for the set of files 138 is stored in the server content data structure 122. In other embodiments, it would be possible to store the content of the set of files 138 in a distributed fashion across a set of clients.

In some example embodiments, enough content is locally available at the client 110-1 for each image file in a subset of content 117 that a read only "thumbnail" image is present, while an editable full resolution image resides on the server 104, which stores the entire content for the set of files 138. In other embodiments, the portion of content present in the subset of content 117 is enough to give overview information. For example, for MP3 files, the artist, song, album information, and optionally a snippet of the song are available in the subset of content 117, while the entire song file resides on the server 104. A similar situation may be present for long word processing documents, where only an abstract and author information is retained in the subset of content 117 while the whole file resides on the server 104.

One advantage of a virtual drive 112 having a virtual drive metadata data structure 114 containing metadata for all files 115, but having a virtual drive content data structure 116 which contains only a subset of content 117 for those same files is that the entire virtual drive 112-1 takes up less storage space on the client 110-1 than would be necessary if the full content of every file were present locally. In this way the user has the illusion of retaining all files locally even on a client system 110-1 with limited storage capacity.

Whenever the entire file content of a particular file is requested by the user, the entire file (or the portion not yet present on the client 110-1) is downloaded over the communication network 102 from the entire content for the set of files 138 on the server 104 as will be explained in more detail in FIG. 11. If a user is connected to the server system 104 via the network 102, then when a user requests a file, the most recent version of the requested file will be returned. The most recent version of the file may reside in the virtual drive content data structure 116 in the subset of content 117, or it may reside on the server system 104. In some embodiments, the selection of the latest version of the requested file can be based on a comparison of file timestamps or other metadata located in a virtual drive metadata data structure 114-A(1) on the client system 110, and corresponding timestamps or other metadata located in the metadata data structure 120 for that virtual drive 132 on the server system 104. If the client system 110 is not connected to the server system 104, then the virtual drive 112 returns the locally cached version of the requested file stored in its subset of content 117 in the virtual drive content data structure 116-A(1). If there is no cached version of the file, then the virtual drive 112 returns an error and notifies the user (e.g., through a callout bubble) that the requested file is not available offline.

Atomic Save Operation

When some programs edit an existing file and then save it, these programs do not actually modify the old file. Instead, they create a new file in the place of the old file. In such cases, what looks like a "file save" to a user is actually a combination of save, delete, and rename operations. This combination, whose specific operations change from program to program, is called an "atomic save operation." One reason an atomic save operation is performed is so that if a file save operation is disrupted, at least the last version of the file (sometimes herein called "the old file") is not lost.

However, when a new file replaces an old file during an atomic save operation, metadata connected with the old file is lost. The present application discusses methods and systems for preserving, rather than losing, desired metadata. We refer to this as "unwinding an atomic save operation." Once an atomic save operation has been detected and the desired metadata has been preserved, a synchronization of the client 110 with the server 104 can be performed as described above and further described in connection with FIG. 10.

Figure 2:
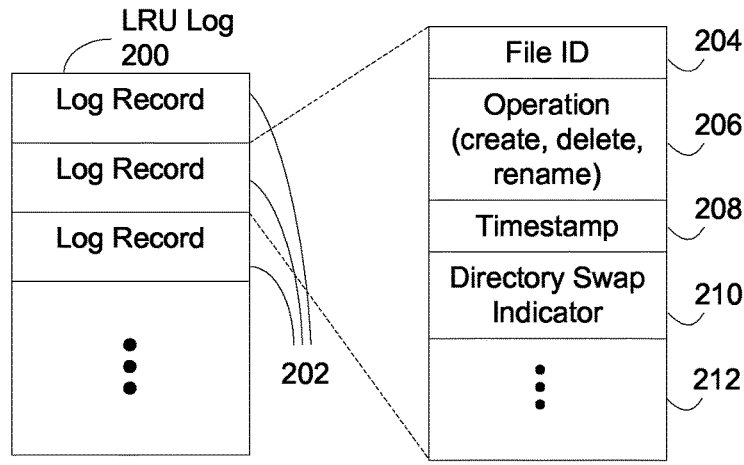
FIG. 2 is a block diagram of one embodiment illustrating a log of recent file operations.

FIG. 2 is a block diagram of one embodiment illustrating a log of recent file operations, herein called the LRU log 200. The LRU (Least Recently Used) log 200 has log records 202, each representing a "recent" file operation such as a create, delete, or rename operation. In some embodiments, each log record 202 contains a globally unique file identifier (file ID) 204. This globally unique file identifier 204 is unique across the entire file management system 100. Alternately, in some other embodiments the file ID 204 for each distinct file is unique within the share (e.g., a file system or user account) within which the file is located; in these embodiments, the combination of the share ID (which identifies the user account or file system in which the file is located) and the file ID for each distinct file is globally unique across the entire file management system 100. The file identifier 204 is used by both the client 110 and the server 104 during synchronization to verify that they are dealing with the same file. The log record 202 further contains information identifying a recent file operation 206 that has been performed on the identified file. File operations for which log records 202 are created include create operations, delete operations, and move or rename operations. The log record 202 also contains a timestamp 208 of when the file operation 206 took place. In some embodiments, the log record 202 further contains a directory swap indicator 210 which indicates that the file identified by a file ID 204 is connected to a directory that has undergone an atomic save operation. In some embodiments, a log record contains additional information 212, such as a metadata handle which is used as an identifier of related metadata stored in other data structures.

In some embodiments, records are removed from the LRU log 200 in accordance with one or more eviction policies. In some embodiments, the LRU log 200 only keeps information in the LRU log 200 for a predetermined period of time. For example, in some embodiments records for operations having timestamps more than fifteen seconds are evicted from the LRU log 200. Furthermore, in some embodiments, the LRU log 200 has a capacity for storing a predefined number of log records 202. For example, the limit may be fifty log records 202. Once this limit is reached, some log records 202 will be evicted. In some embodiments, the oldest log records will be evicted first, as defined by their timestamp 208, until the number of remaining records 202 does not exceed the limit. In other words, information regarding a particular operation in the log will be conditionally removed if information regarding at least a predetermined number of additional operations have subsequently been stored in the log 200. In some embodiments, a combination of time in the LRU and number of log items is used to determine when a record is evicted from the LRU log 200.

Figure 3:
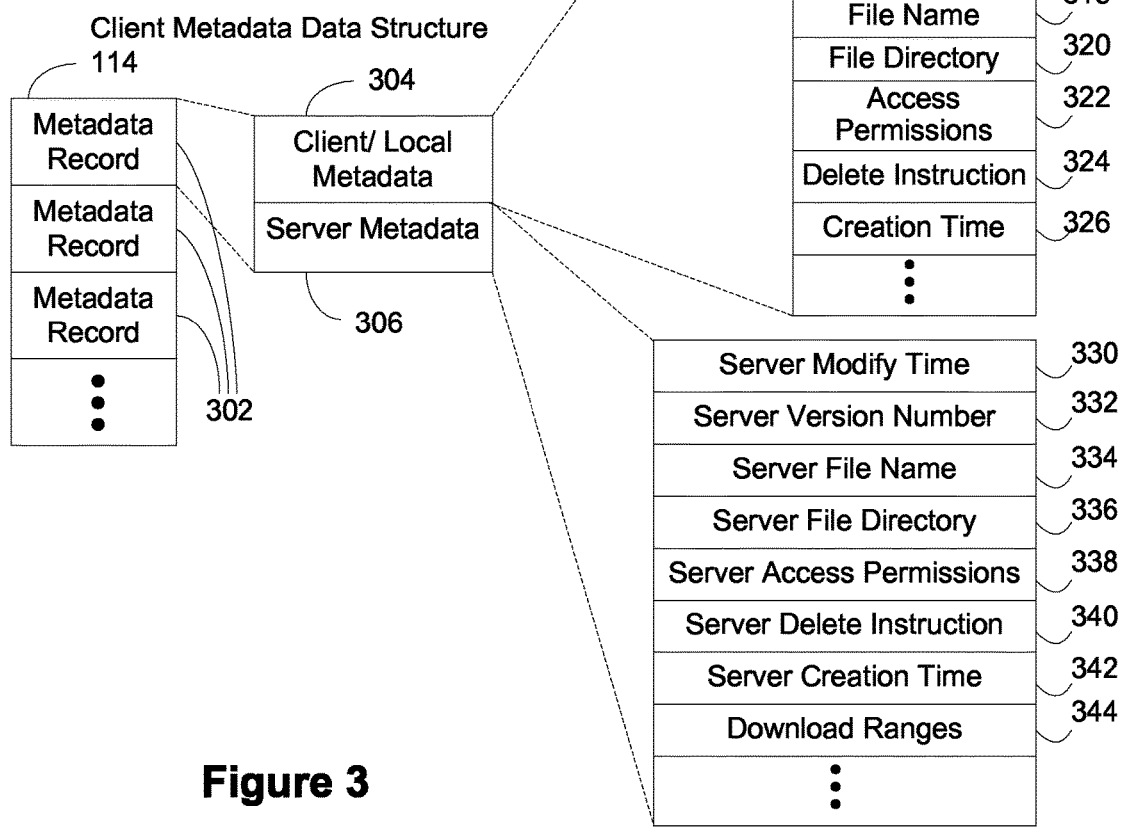
FIG. 3 is a block diagram of one embodiment illustrating a client metadata data structure.

FIG. 3 is a block diagram of one embodiment illustrating a client metadata data structure 114. As described above, with reference to FIG. 1, an instance of a virtual drive on a client 110 contains file content, which may be stored in a content data structure 116, and metadata, which may be stored in a metadata data structure 114. The client metadata data structure 114 includes a plurality of client metadata records 302, including one metadata record 302 for each file in the virtual drive.

In this document, a distinction is drawn between "a file" and its metadata. The metadata for a file is stored in a metadata record 302, and the content of the file is pointed to by a content pointer 310, which is maintained in the file's metadata record 302. However, during atomic save operations, the relationship between a file and its metadata record becomes complicated, as described below. For clarity of discussion, "the file" is treated as being the content identified by a content pointer 310. A user file may have two or more versions that coexist during a save operation, and each of these versions is considered to be a distinct file with a distinct content pointer.

Each metadata record 302 contains both client (or local) metadata 304 and server metadata 306. The server metadata 306 contains metadata that the client last received from the server 104 during the most recent synchronization process. The client/local metadata 304 may contain metadata that has changed locally, but has not yet been synchronized with the server 104. After synchronization with the server 104 and before any metadata modification, the client metadata 304 and the server metadata 306 are consistent. If a new file is created on the client 110 that has not ever been synchronized with the server 104, then the server metadata 306 will contain a set of null values because no server metadata yet exists. The client metadata 304 contains a plurality of individual metadata fields. A subset of these fields is shown in FIG. 3.

In some embodiments, the client metadata comprises some or all of the following fields.

A file identifier (file ID) 204 that identifies the file either within a particular share, or across the entire file management system. The same file ID 204 is also present in the server metadata record 306. In most embodiments, the server metadata file ID 204 and the client metadata 304 file ID 204 are identical, hence they share one reference number in FIG. 3. When a new file is created at the client, a new file ID 204 is assigned to it. Prior to synchronization, the File ID 204 in the server metadata will contain a null value because the server 104 does not yet have a copy of the newly created file.

A content pointer 310 that points to the content of the file itself, if present on the client. In some embodiments, the file content (if present on the client) is stored in the virtual drive content data structure 116.

A modify time 312, that states when the file was last modified.

A version number 314 that states what version of the file is currently stored. In some embodiments, even after a file has been modified, the version number 314 will remain unchanged. In such instances, the version number 314 is incremented at the server 104 during synchronization, rather than at the client 110 after modification. Server control of the version number is helpful in keeping track of file changes when a file is shared by multiple users who may be simultaneously modifying the file.

An application instance ID 316 that identifies the particular instance of the program or application used in the most recent modification of the file. In most embodiments, an atomic save of a respective file by an instance of an application results in two (or more) separate files that have the application's instance identifier, application instance ID 316. In other words, the same application instance ID 316 is given to all files created or modified by an atomic save operation performed by that application instance. In the simplest case, an atomic save operation produces one new file and modifies another, and the client metadata for both files are assigned the same application instance ID.

A file name 318, which is the current name of the file. During an atomic save, some programs change the name of the file. For example, a file named filename.doc being replaced may be re-named filename.temp or filename.old.

A file directory 320 that identifies the directory "in which the file is stored" or the path (also called the file path) associated with the file. For example, the directory or path may be something like "k:\a\b\c".

Access permissions 322 which include information regarding which, if any, other users may access the file, and what rights they are allowed, such as "read only" rights or "modification" rights.

Delete instruction 324 that indicates whether or not the file has been marked for deletion. If a file is not marked for deletion, the value of the delete instruction 324 is null. In some embodiments, during an atomic save operation an old file will be marked for deletion but will not be deleted immediately. Instead, it will be deleted only after synchronization with the server takes place. In some embodiments, if a file is not marked for deletion, the metadata record does not include a delete instruction at all.

Creation time 326 that indicates when the file was originally created. A new file created on the client 110 will have a creation time 326 of its creation, which the client will communicate to the server 104 during synchronization. Older files, i.e., files that have been previously synchronized with the server 104, also have the creation times 326 of their original creation. Modify times 312 and access times (not shown) keep track of subsequent modifications or access operations performed after creation.

In some embodiments, the server metadata 306 comprises some or all of the following fields.

A server modify time 330, that states when the version of the file most recently synchronized with the server 104 was last modified.

A server version number 332 that identifies the version of the file that was stored at the server the last time the client successfully synchronized metadata with the server. Typically, if the client and server have recently synchronized, the server version number 332 identifies the version of the file that is currently stored at the server.

A server file name 334, which is the name of the file at the server as of the last time that the client synchronized metadata with the server 104.

A server file directory 336 that identifies, for the version of the file most recently synchronized with the server 104, the directory "in which the file is stored" or the path (also called the file path) associated with the file.

Server access permissions 338 which include, for the version of the file most recently synchronized with the server 104, information regarding which, if any, other users may access the file, and what rights they are allowed, such as "read only" rights or "modification" rights.

Server delete instruction 340 that indicates whether or not the version of the file most recently synchronized with the server 104 has been marked by the server 104 for deletion.

Server creation time 342 that indicates, for the version of the file most recently synchronized with the server 104, the time at which a client originally created the file.

Download ranges 344 that indicate, what portions (if any) of file content are currently downloaded from the server content data structure 122 into the client content data structure 116. In some embodiments, the entire file content may be present in the client content data structure 116 for some or all of the files in the virtual drive. In other embodiments, portions of the file content (i.e., a subset, which is less than the full or entire file content) may be present in the client content data structure for one or more of the files in a virtual drive. Furthermore, in some embodiments, none of the file content of a respective file is present in the client content data structure, at least until the client (or the user of the client) requests access to the respective file.

A table of examples of Metadata fields is shown below. In some embodiments, the client metadata or server metadata contains a subset of these fields, and furthermore, some embodiments also include additional metadata fields.

TABLE I

Example of Meta-Entry Fields

| Field Name | Description |
| --- | --- |
| GUID | file ID |
| parent_id/ | ID of parent of file (e.g., folder/directory) |
| Version (base/server/upload versions) | The server system version of this file |
| Name | The file name |
| File Directory | File path associated with the file |
| Content Pointer | Pointer to File/Content database record |
| user_size | Size of the data |
| storage_size | Actual size required to store the data |
| Cs | Checksum of the data |
| Mtime | When the file was last modified |
| Atime | When the file was last accessed |
| Ctime | When the file was created |
| is_del | Instruction indicating deletion or no deletion |
| is_shared | Instruction indicating file sharing information |
| mode | OS dependent mode fields |
| attributes | OS dependent attribute fields |
| flags | Status flags (e.g., IS_DIRTY) |
| has_data | Whether the file data is locally available |
| has_data_s | If the server system has data for this entry |
| application instance id | Identifier of the instance of an application used in the modification of the file |

TABLE I-continued

Example of Meta-Entry Fields

| Field Name | Description |
| --- | --- |
| metahandle | Unique identifier local to a particular client used to identify a metadata record |
| sync_ts | The server timestamp of when this entry was last changed on the server |

Figure 4:
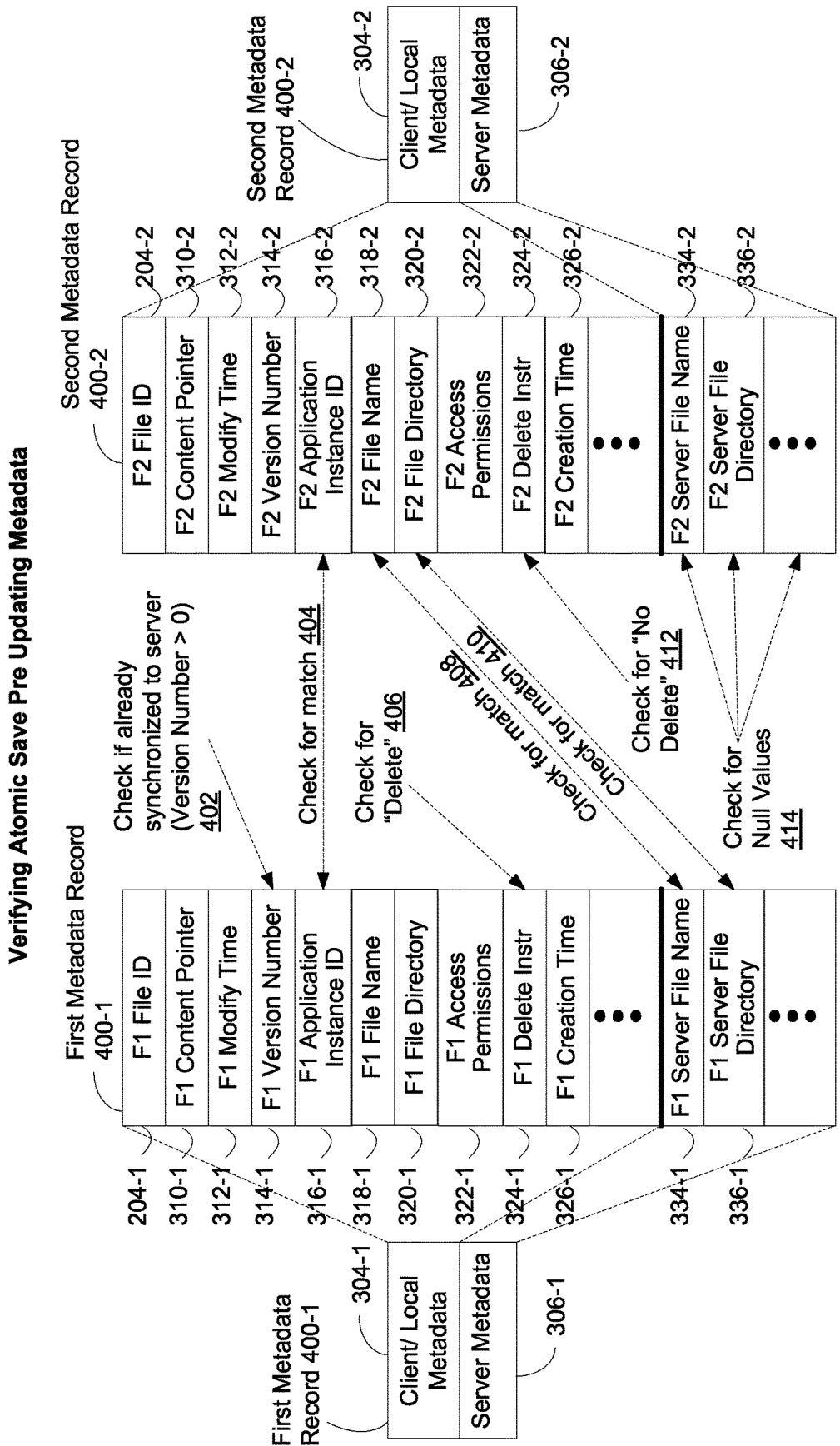
FIG. 4 is block diagram schematically representing metadata verifications used to identify an atomic save in accordance with some embodiments.

FIG. 4 is block diagram schematically representing metadata verifications used to identify an atomic save in accordance with some embodiments. In some embodiments, first metadata record 400-1 and a second metadata record 400-2 have content pointers 310 that refer to files that may contain different versions of a respective file recently atomically saved. These two metadata records are identified based on records in the LRU for file operations that may, or may not, correspond to an atomic save. The files referenced by these two metadata records are thus identified as potential different versions of a respective file recently atomically saved. For example, one of these two metadata records may correspond to a "save" operation listed in the LRU and the other may correspond to a "move" or "delete" operation listed in the LRU. In some embodiments, determining that these two operations comprise an atomic save of a respective file includes one or more of the following described verifications with respect to the metadata of the two files. As discussed below, once an atomic save has been verified, one or more of the associated metadata records are modified.

In the example embodiment shown in FIG. 4, the verifications described below are meant to verify that the first metadata record 400-1 is associated with an "old version" of a respective file, and the second metadata record 400-2 is associated with a "new version" of a respective file. However, in other embodiments, the converse may be appropriate. In other embodiments, an atomic save may involve more than two operations and/or more than two files. Each of the individual verifications described here are necessary, but not sufficient, for "proving" or verifying that two files are related versions of a respective file. From another perspective, two files are determined or verified to be related versions of a respective file only if none of the individual verification tests are failed.

In some embodiments, the first metadata record 400-1 version number 314-1 is checked to see if it has a value of greater than zero (402). If the version number 314-1 value is greater than zero then the first metadata record 400-1 represents content that is not a "new" file because new files are given a version number of zero prior to synchronization with the server.

In some embodiments, the first metadata record 400-1 application instance ID 316-1 is compared to the second metadata record 400-2 application instance ID 316-2. If the application instance IDs 316 do not match (404), then the two files are not related to the same respective file. On the other hand, if the application instance IDs 316 do match (404), then it is possible that both files are related to the same respective file.

In some embodiments, the first metadata record 400-1 is checked to see if an instruction to delete 324-1 the file exists (406). In some embodiments, a delete instruction 324-1 is a delete flag. If a delete instruction is found (406), then it is likely that the first metadata record 400-1 is an old version of a respective file that, according to the atomic save operation, is no longer needed. In the present application, a delete instruction will not be acted upon until after synchronization, but the presence or absence of a delete instruction is informative regarding whether the first metadata record 400-1 is or is not a part of an atomic save operation.

Similarly, in some embodiments, the second metadata record 400-2 is checked to see if an instruction to delete 324-2 does not exist (412). In some embodiments, the lack of a delete instruction 324 indicates that the second metadata record 400-2 points to current or new content. Therefore, checking for a no delete instruction (412) verifies the likelihood that the second metadata record 400-2 is a new version of the respective file.

In some embodiments, atomic save verification involves checking for a match (408) between the first metadata record 400-1 server file name 334-1 and the second metadata record 400-2 (local) file name 318-1. In some embodiments, when an atomic save operation has taken place, the old version of the respective file, named filename.doc, is given a new name like filename.temp or filename.old. Then the new file, replacing the old file in the atomic save is given the original name, in this example filename.doc. However, even though the old version has file name 318-1 such as filename.old, the old version still retains its original name, filename.doc, as a part of its server metadata 306-1. Specifically, in this example, the server file name 334-1 for the first metadata record 400-1 is still filename.doc. Therefore, if the first metadata record 400-1 server filename 334-1 and the second metadata record 400-2 (local) file name 316-2 match (408) then it is very likely that the two files represent different versions of the same respective file that was atomically saved.

In some embodiments, atomic save verification involves checking for a match (410) between the first metadata record 400-1 server file directory 336-1 and the second metadata record 400-2 file directory 320-2. A file directory identifies the directory "in which the file is stored" or the path (also called the file path) associated with the file. In a similar fashion to the filename replacement described above, during an atomic save, an old version of a respective file will retain its file directory 336 in its server metadata 306-1, while the new version of the respective file will be given the same file directory 320. Therefore, if the first metadata record 400-1 server file directory 336-1 and the second metadata record 400-2 (local) file directory 320-2 match (410) then it is possible that the two files represent different versions of the same respective file that was atomically saved. But, if the first metadata record 400-1 server file directory 336-1 and the second metadata record 400-2 (local) file directory 320-2 do not match (410) then the two files do not represent different versions of the same respective file.

In some embodiments, the second metadata record 400-2 server metadata 306-2 is checked for null values (414). If all of the server metadata 306-2 is null, then the second metadata record has probably never been synchronized with a server 104. Therefore, it is possible that the second metadata record 400-2 points to new content of a respective file.

Figure 5A:
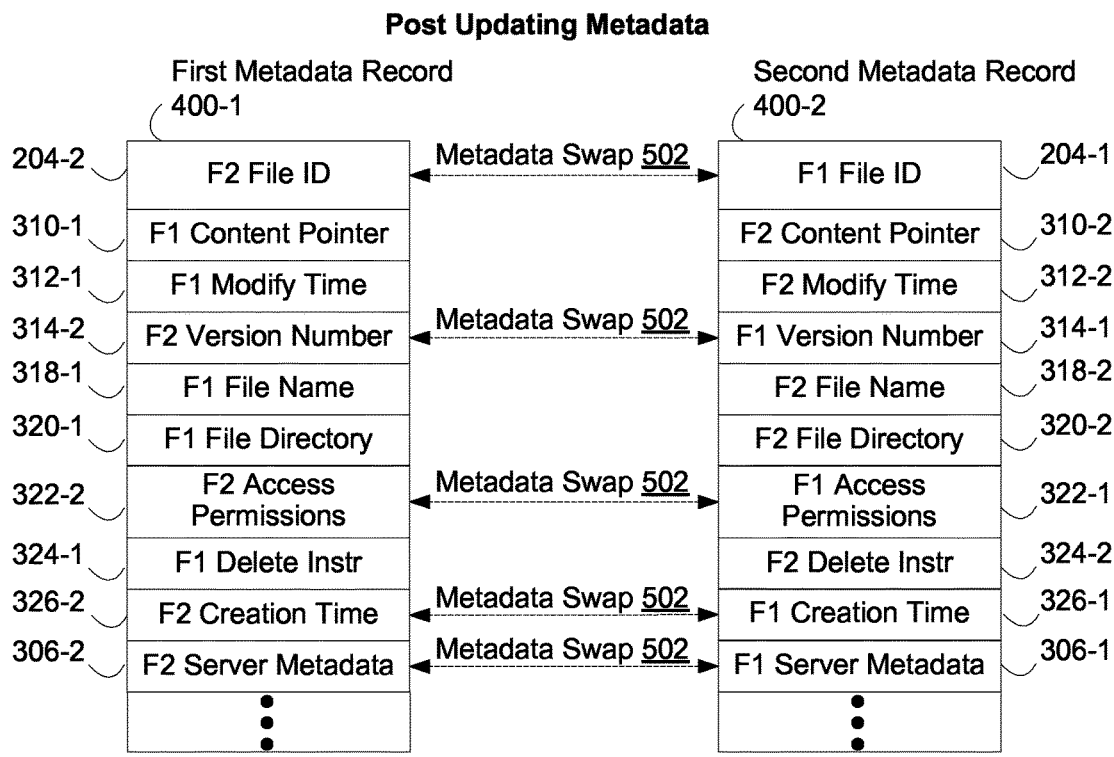
FIGS. 5A and 5B illustrate two embodiments of swapping metadata between metadata records after an atomic save has been determined.
Figure 5B:
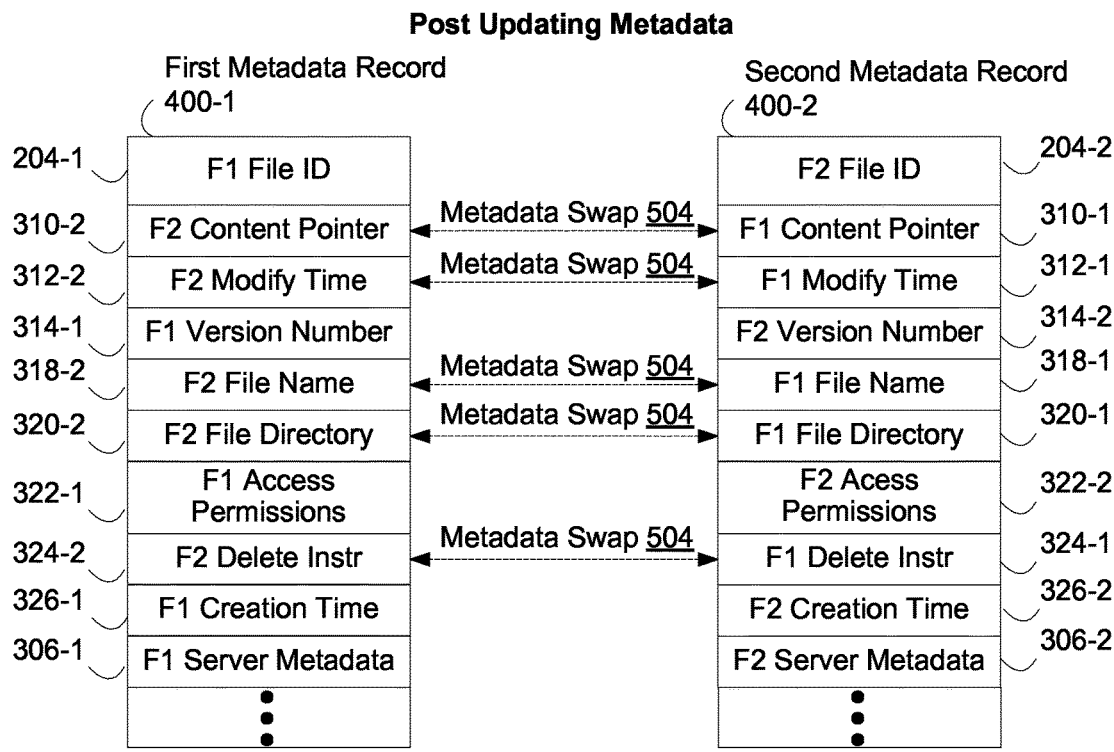

FIGS. 5A and 5B illustrate two embodiments of swapping metadata between metadata records after an atomic save has been determined. FIG. 5A illustrates an embodiment where file ID's 204, version numbers 314, access permissions 322, creation times 326, and server metadata 306 is swapped between the first metadata record 400-1 and the second metadata record 400-2 (502). FIG. 5B illustrates an embodiment where the file content 310, modify time 312, file name 318, file directory 320, and delete instructions 324 are swapped (504).

In embodiments where the second file (F2) contains the "new" (or most recently modified) content, and the first file (F1) contains the "old" content, the desired metadata belongs with the post swap second metadata record 400-2 for the swap (502) illustrated in FIG. 5A and the first post swap metadata record 400-1 for the swap (504) embodiment illustrated in FIG. 5B. In other words, the swap embodiment shown in FIG. 5A has the desired metadata in the second metadata record 400-2, whereas the swap embodiment shown in FIG. 5B has desired metadata in the first metadata record 400-1.

On the other hand, in embodiments where the first file (F1) contains "new" (or most recently modified) content, and the second file (F2) contains "old" content, the converse will be true, because the data pointer which is desired to be retained is F1 in such an embodiment.

In both embodiments, at the end of the swapping information the first file ID 204-1 is associated with the second content pointer 310-2. In other words, in embodiments where the second file contains the "new" (or most recently modified) content, and the first file contains the "old" content, the "new" content is now associated with the "old" globally unique file identifier (file ID) 204. As such, during synchronization, the "new" content will become a new version of the "old" file as identified by the file ID 204 on the server 104.

In the embodiments shown in FIGS. 5A and 5B other metadata that will be preserved with the "new" (F2) content includes: the "new" (F2) modify time 312-2, the "old" (F1) version number 314-1, the "new" (F2) file name 318-2, the "new" (F2) file directory 320-2, the "old" (F1) access permissions 322-1, the "new" (F2) delete instructions 324-2, the "old" (F1) creation time 326-1, and the "old" (F1) server metadata 306-1. In some embodiments, the above listed metadata is the metadata which should be retained after synchronization, i.e., it is the desired metadata. Therefore, the desired metadata is associated with the "old" (F1) file ID 204-1. As such, after synchronization, the desired metadata will become a new version of the "old" file as identified by the file ID 204-1 on the server 104.

Figure 6:
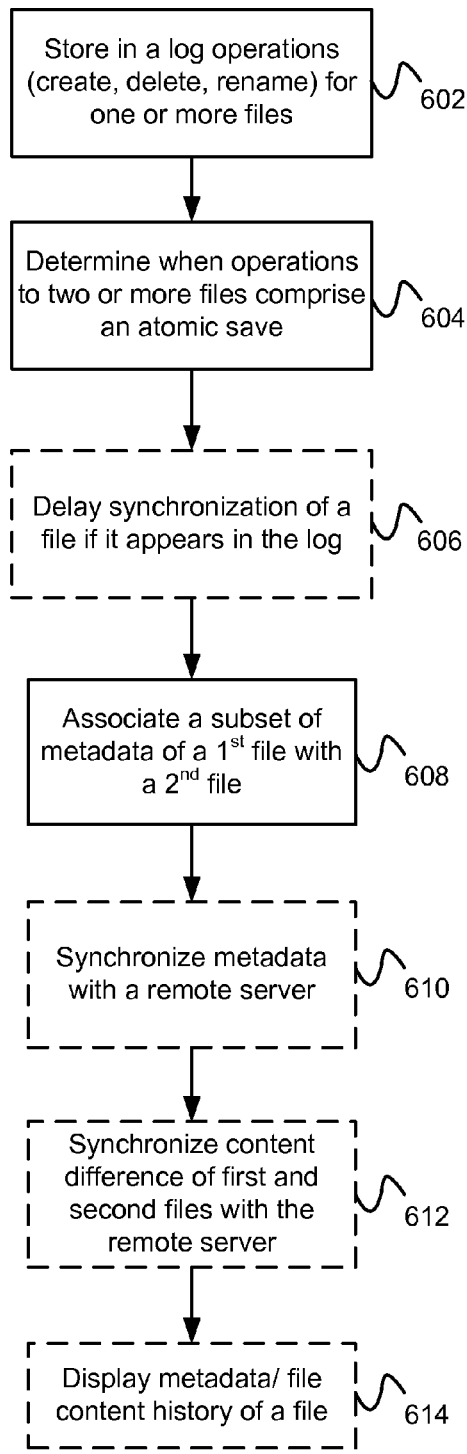
FIG. 6 is a flow diagram of one embodiment a file level atomic save unwind.

FIG. 6 is a flow diagram of one embodiment a method for unwinding a file level atomic save operation 600. The file level atomic save unwind method 600 takes place on a client 110 system. The file level atomic save unwind method 600 may be governed by instructions that are stored in a computer readable storage medium and that are executed by one or more processors of one or more servers. Each of the operations shown in FIG. 6 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The file level atomic save unwind method 600 comprises some or all of the following operations. Storing (602) in a LRU log 200 information denoting a plurality of create, delete, and rename operations 206 on one or more files in a file management system 100. Determining (604) when two or more operations 206 denoted in the LRU log 200, including an operation 206 involving a first file and another operation 206 involving a second file, comprise an atomic save of a respective file. In some embodiments, the first file is a first version of the respective file, and the second file is a second version of the respective file. Furthermore, the first file and second file each have associated metadata 302. Associating (608) a subset of the metadata of the first file 400-1 with the second file. In some embodiments, the associating (608) is such that at least one of a globally unique file identifier 204-1 and file access permissions 322-1 associated with the first file become associated with the second file.

In some embodiments, the method may further comprise synchronizing (610) with a remote server metadata database 120 at least portions of the metadata of at least one of the first file and the second file (400-1 and 400-2). In some embodiments, the method may further comprise determining if the LRU log 200 contains information for a file scheduled for synchronization with a remote server 104; so long as the LRU log 200 contains information for the file scheduled for synchronization, inhibiting or delaying (606) the synchronization; and if the LRU log 200 does not contain information for the file scheduled for synchronization, synchronizing (610) metadata for the file with the remote server. In some embodiments, the method may further include obtaining content from the first file and content from the second file; comparing the content from the second file with the content from the first file to obtain a content difference; synchronizing the content difference (612) with a remote server content database 122. In some embodiments, the method may further include in response to a user request, displaying (614) metadata and/or content history information associated with a respective file, wherein the history information includes at least one atomic save.

In some embodiments, the determining operation (604) involves performing one or more metadata verifications as described in FIG. 4. In some embodiments, when a log record 202 is added to the LRU log 200 these verifications are performed on the metadata record 400 corresponding to the new log record 202 compared with every metadata record 400 corresponding to the other log records 202 in the LRU. In other embodiments, only a subset of metadata records 400 corresponding to the other log records 202 are compared with the metadata record 400 corresponding to the newly added log record 202. For example, in some embodiments, before the verifications described in FIG. 4 are performed, the newly added log record 202 is compared to other log records 202 in the LRU 200, and if the other log records 202 have matching operations 206 to the newly added log record 202 (e.g., both are deleted files) then the verifications described in FIG. 4 are not performed on the metadata records 400 associated with those log records 202 having matching operations.

In some embodiments, the associating (608) includes updating a subset of the metadata of the second file 400-2 with a subset of the metadata of the first file 400-1 such that the second file metadata 400-2 includes two or more of the set consisting of: a globally unique file identifier 204-1, a version number 314-1, access permissions 322-1, a creation time 326-1, and server metadata 306-1 of the first file metadata 400-1 as shown in FIG. 5A. In some embodiments, a subset of the metadata of the second file 400-2 also includes one or more of the set consisting of: a content pointer 310-2, a modification time 312-2, a file name 318-2, a file directory 320-2, and a delete instruction 324-2 of the second metadata file 400-2 as shown in FIG. 5A.

In some embodiments, the associating (608) includes updating a subset of the metadata of the first file 400-1 with a subset of the metadata of the second file 400-2 such that the first file metadata 400-1 includes two or more of the set consisting of: a content pointer 310-2, a modification time 312-2, a file name 318-2, a file directory 320-2, and a delete instruction 324-2 of the second file metadata 400-2 as shown in FIG. 5B. In some embodiments, a subset of the metadata of the first file 400-1 also includes one or more of the set consisting of: a globally unique file identifier 204-1, a version number 314-1, access permissions 322-1, a creation time 326-1, and server metadata 306-1 of the first file metadata 400-1 as shown in FIG. 5B.

In some embodiments, the associating includes updating a subset of the metadata of the second file with a subset of the metadata of the first file such that the second file metadata includes two or more of the set consisting of: a globally unique file identifier, a version number, access permissions, a creation time, and server metadata of the first file metadata.

In some embodiments, the associating (608) may comprise replacing a subset of the metadata of the second file 400-2 with a subset of the metadata of the first file 400-1, including file access permissions 322-1 associated with the first file. In some embodiments, the associating (608) may comprise updating the metadata of the second file 400-2 with a subset of the metadata of the first file 400-1, such that the updated metadata of the second file 400-2 includes at least one of a globally unique file identifier 204-1 and file access permissions 322-1 of the first file. In some embodiments, the associating comprises swapping a subset of the metadata of the second file 400-2 with the subset of the metadata of the first file 400-1 as shown in FIGS. 5A and 5B.

In some embodiments, the metadata of the first file 400-1 includes a pointer to the content of the first file (first metadata record content pointer 310-1) and the metadata of the second file 400-2 includes a pointer to the content of the second file (second metadata record content pointer 310-2) as shown in FIG. 3. In some embodiments, the metadata of the first file 4001-1 and the metadata of the second file 400-2 are stored on the client device 110 in a metadata data structure 114 separate from content of the first file and second file, which is stored in a content data structure 116 as shown in FIG. 1.

In some embodiments, the metadata of the first file 400-1 includes a first metadata set created prior to the operation 206 involving the first file. In some embodiments, server metadata 306-1 is included in a first metadata set. In some embodiments, the metadata of the first file 400-1 also includes a second metadata set that includes values of metadata created by the operation 206 involving the first file. For example, in some embodiments, a second metadata set created by the operation involving the first file may include an updated file name 318-1, file directory 320-1, and delete instructions 324-1. In some embodiments, the metadata of the second file 400-2 includes a third metadata set created prior to the operation 206 involving the second file. In some embodiments, server metadata 306-2 is included in a third metadata set. If the second file is new, i.e., it has never been synchronized with the server 104, then the third metadata set may contain entirely null values. In some embodiments, the metadata of the second file 400-2 includes and a fourth metadata set that includes values created by the operation involving the second file. In some embodiments, the fourth metadata set may include a content pointer 310-2 a modify time 312-2 a file name 318-2, a file directory 320-2, and a delete instruction 324-2 (which likely indicates not deleting the second file.)

In some embodiments, and the determining (604) described above, includes matching both a filename 334-1 and a file directory 336-1 in the first metadata set and with the filename 318-1 and a file directory 320-1 in the fourth metadata set as shown in FIG. 4 (408 and 410). In some embodiments, the determining (604) further includes determining that the third metadata set comprises entirely null values. In some embodiments, the associating (608) includes swapping a subset of the third metadata set with a subset of the first metadata set. One embodiment of a first and third metadata swap is as shown in FIG. 5A, (F2 Server Metadata and F1 Server Metadata swap 502). In some embodiments, the associating (608) includes swapping a subset of the fourth metadata set with a subset of the second metadata set. In some embodiments, this may include swapping all the elements shown in FIG. 5B. In other embodiments, this may include swapping all of the elements except server metadata shown in FIG. 5A.

In some embodiments, the determining (604) further comprises one or more additional checks, or predefined criteria, for an atomic save operation. In some embodiments, the two or more operations 206 are determined to be an atomic save operation when one or more predefined criteria are satisfied, and one of the predefined criteria is that the two or more operations 206 were performed by the same instance of an application 316, as shown in FIG. 4, "check for match" (404). In some embodiments, another of the predefined criteria is that the first file metadata has been synchronized with a remote server. In other words, another of the predefined criteria is that metadata of the first file 400-1 includes a version number 314-1 above zero, as shown in FIG. 4 "check if already synchronized to server (version number >0" (402). In some embodiments, another of the predefined criteria is that the metadata of the second file 400-2 does not include a delete instruction, as shown in FIG. 4 "check for 'No Delete'" (412). In some embodiments, another of the predefined criteria is that the metadata of the first 400-1 file includes a delete instruction, as shown in FIG. 4 "Check for 'Delete'" (406).

Figure 7:
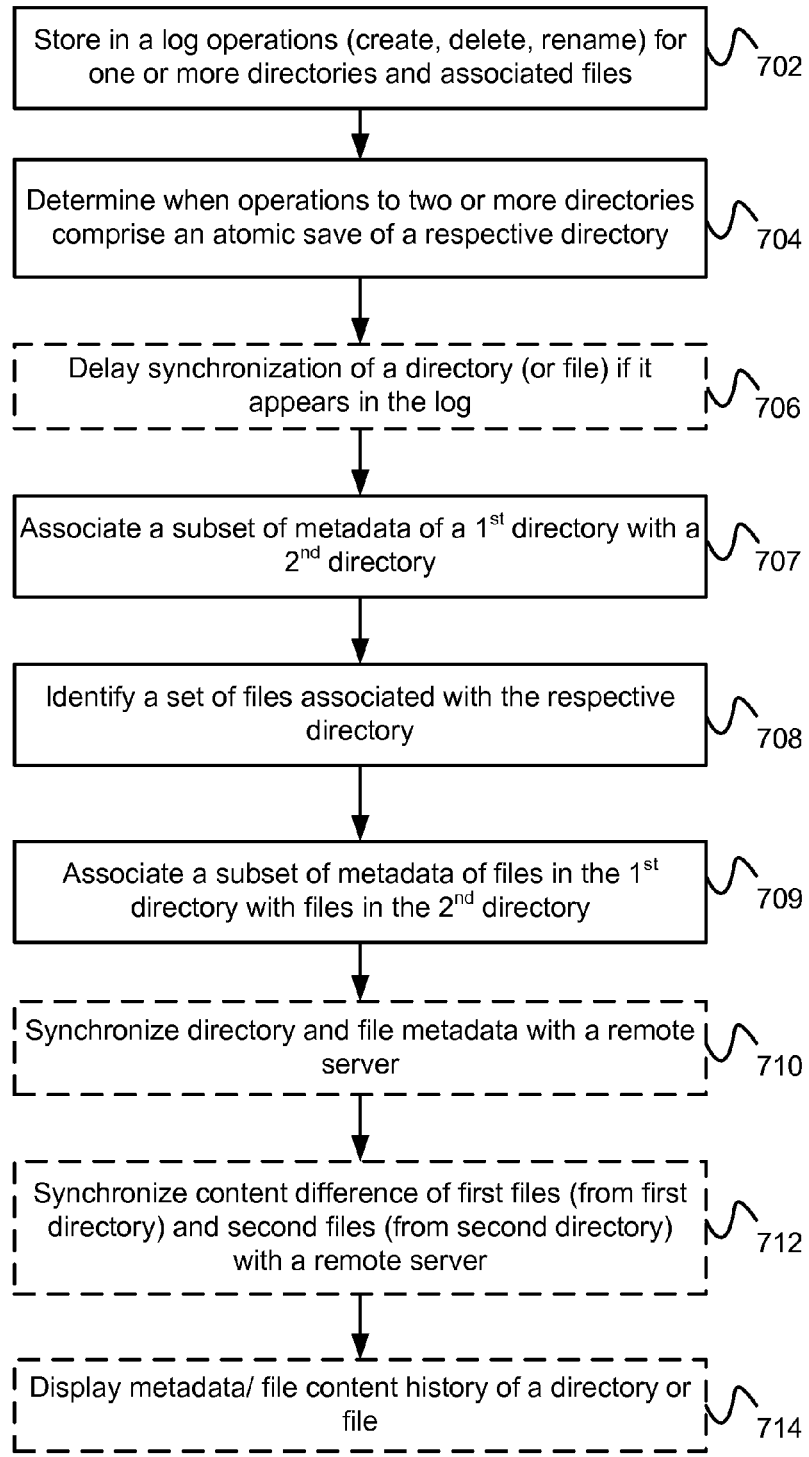
FIG. 7 is a flow diagram of one embodiment a directory level atomic save unwind.

FIG. 7 is a flow diagram of one embodiment a method for unwinding a directory level atomic save operation 700. The directory level atomic save unwind method 700 takes place on a client 110 system. The directory level atomic save unwind method 700 may be governed by instructions that are stored in a computer readable storage medium and that are executed by one or more processors of one or more servers. Each of the operations shown in FIG. 7 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The directory level atomic save unwind method 700 is a method of preserving directory metadata associated with an edited directory and comprises some or all of the following operations. Storing (702) in a LRU log 200 information denoting a plurality of create, delete, and rename operations 206 on one or more directories and one or more associated files in the one or more directories in a file management system 100. Determining (704) when two or more operations 206 denoted in the LRU log 200, including an operation 206 involving a first directory and another operation 206 involving a second directory, comprise an atomic save of a respective directory. In some embodiments, the first directory is a first version of the respective directory, and the second directory is a second version of the respective directory. Furthermore, the first directory and second directory each have associated metadata. Associating (707) a subset of the metadata of the first directory with the second directory. Identifying (708), in the respective atomically saved directory, a set of files associated with the respective directory. For a respective file in the identified set of files, the respective file having a corresponding first file in the first version of the respective directory and second file in the second version of the respective directory, associating (709) a subset of the metadata of the first file with the second file. In some embodiments the associating (709) is such that at least one of a globally unique file identifier 204-1 and file access permissions 322-1 associated with the first file become associated with the second file.

In some embodiments, the method may further comprise synchronizing (710) with a remote server metadata database 120 at least portions of at least one of the directory metadata and file metadata with a remote server 104. In some embodiments, the method may further comprise determining if the LRU log 200 contains information for a directory or file scheduled for synchronization with a remote server 104; so long as the LRU log 200 contains information for the directory or file scheduled for synchronization, inhibiting or delaying (706) the synchronization; and if the LRU log 200 does not contain information for the directory or file scheduled for synchronization, synchronizing (710) metadata for the file with the remote server. Optionally, the method may further include obtaining content from first files from a first directory and content from second files from a second directory; comparing the content from each second file with the content from each corresponding first file to obtain a content difference, and then synchronizing the content difference (712) with a remote server content database 122. In some embodiments, the method may further include in response to a user request, displaying (714) metadata and/or content history information associated with a respective directory or file, wherein the history information includes at least one atomic save.

As described above for unwinding a file level atomic save operation, additional operations and permutations of those operations are possible. Unwinding a directory level atomic save operation also has similar and analogous additional operations and permutations. As one of ordinary skill in the art would understand that these additional operations and permutations are easily applied to unwinding a directory level atomic save operation with only minor adjustments, they will not be repeated here.

Figure 8:
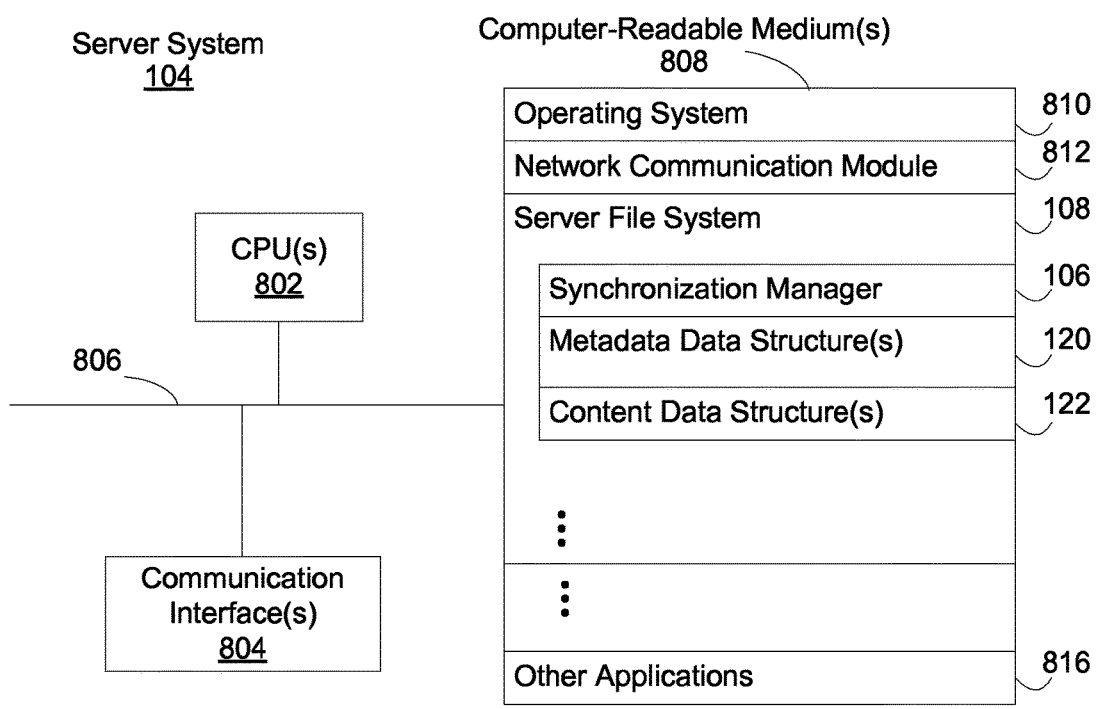
FIG. 8 is a block diagram of an embodiment of the server system shown in FIG. 1.

FIG. 8 is a block diagram of an embodiment of the server system 104 shown in FIG. 1. The server system 104 generally includes one or more processing units (CPU's) 802, one or more network or other communications interfaces 804, memory 808, and one or more communication buses 806 for interconnecting these components. The communication buses 806 may include circuitry (sometimes called a chipset) that interconnects and controls communications between system components. Memory 808 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 808 may optionally include one or more storage devices remotely located from the CPU(s) 802. Memory 808, or alternately the non-volatile memory device(s) within memory 808, comprises a computer readable storage medium. In some embodiments, memory 808 stores the following programs, modules and data structures, or a subset thereof:

an operating system 810 that includes procedures for handling various basic system services and for performing hardware dependent tasks;

a network communication module 812 that is for communicating with client(s) 110(1)-(n) (FIG. 1) via the network 102 (FIG. 1) (wired or wireless) such as the Internet, other wide area networks, local area networks, metropolitan area networks, and so on;

a server file system 108 comprising a synchronization manager 106, a metadata structure 120, and a content (files) data structure 122; and other applications 816 for various other uses that may be necessary or optional.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 808 may store a subset of the modules and data structures identified above. Furthermore, memory 808 may store additional modules and data structures not described above.

Although FIG. 8 shows a "server system" 104, FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on a single client device and single items could be implemented by one or more client devices. The actual number of clients used and how features are allocated among them will vary from one implementation to another, and may depend in part on the amount of data traffic that the system must handle during peak usage periods as well as during average usage periods.

Figure 9:
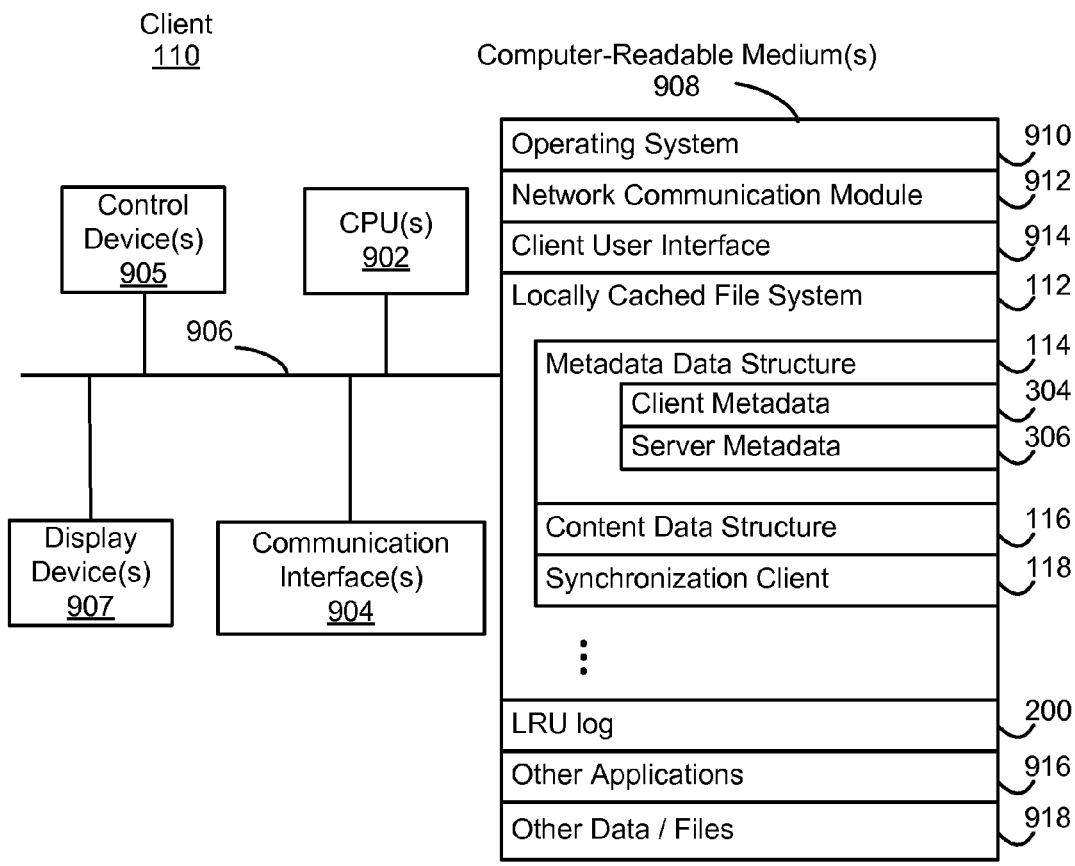
FIG. 9 is a block diagram an embodiment of any one of the client systems shown in FIG. 1.

FIG. 9 is a block diagram an embodiment of any one of the clients 110 (also called a client system, client device, client computer, etc.) shown in FIG. 1. The client system 110 typically includes one or more processing units (CPU's) 902, one or more network or other communications interfaces 904, memory 908, and one or more communication buses 906 for interconnecting these components. The client 110 optionally may include a user interface comprising one or more display devices 907 and one or more control devices 905 such as a keyboard. Memory 908 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 908 may optionally include one or more storage devices remotely located from the CPU(s) 902. Memory 908, or alternately the non-volatile memory device(s) within memory 908, comprises a computer readable storage medium. In some embodiments, memory 908 stores the following programs, modules and data structures, or a subset thereof:

an operating system 910 that includes procedures for handling various basic system services and for performing hardware dependent tasks;

a network communication module 912 (or set of instructions) that is for communicating with the server system 104 (FIG. 1) via the network 102 (FIG. 1) (wired or wireless) such as the Internet, other wide area networks, local area networks, metropolitan area networks, and so on;

a client user interface 914, which may include procedures for presenting information about files, file directories and the like using the user interface of the client 110;

a locally cached file system 112 comprising a metadata data structure 114 with both client metadata 304 and server metadata 306, a content data structure 116, and a synchronization client 118 as was described in FIG. 1;

a LRU log 200, which is a log of recent file operations, as was described in FIG. 2;

other applications 916 for various other uses that may be necessary or optional; and other data and or files 918 which may also be necessary or optional.

Each of the above identified elements may be stored in one or more of the previously mentioned memory devices 908, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 908 may store a subset of the modules and data structures identified above. Furthermore, memory 908 may store additional modules and data structures not described above.

Although FIG. 9 shows a "client system" 110, FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on a single client device and single items could be implemented by one or more client devices. The actual number of clients used and how features are allocated among them will vary from one implementation to another, and may depend in part on the amount of data traffic that the system must handle during peak usage periods as well as during average usage periods.

Figure 10:
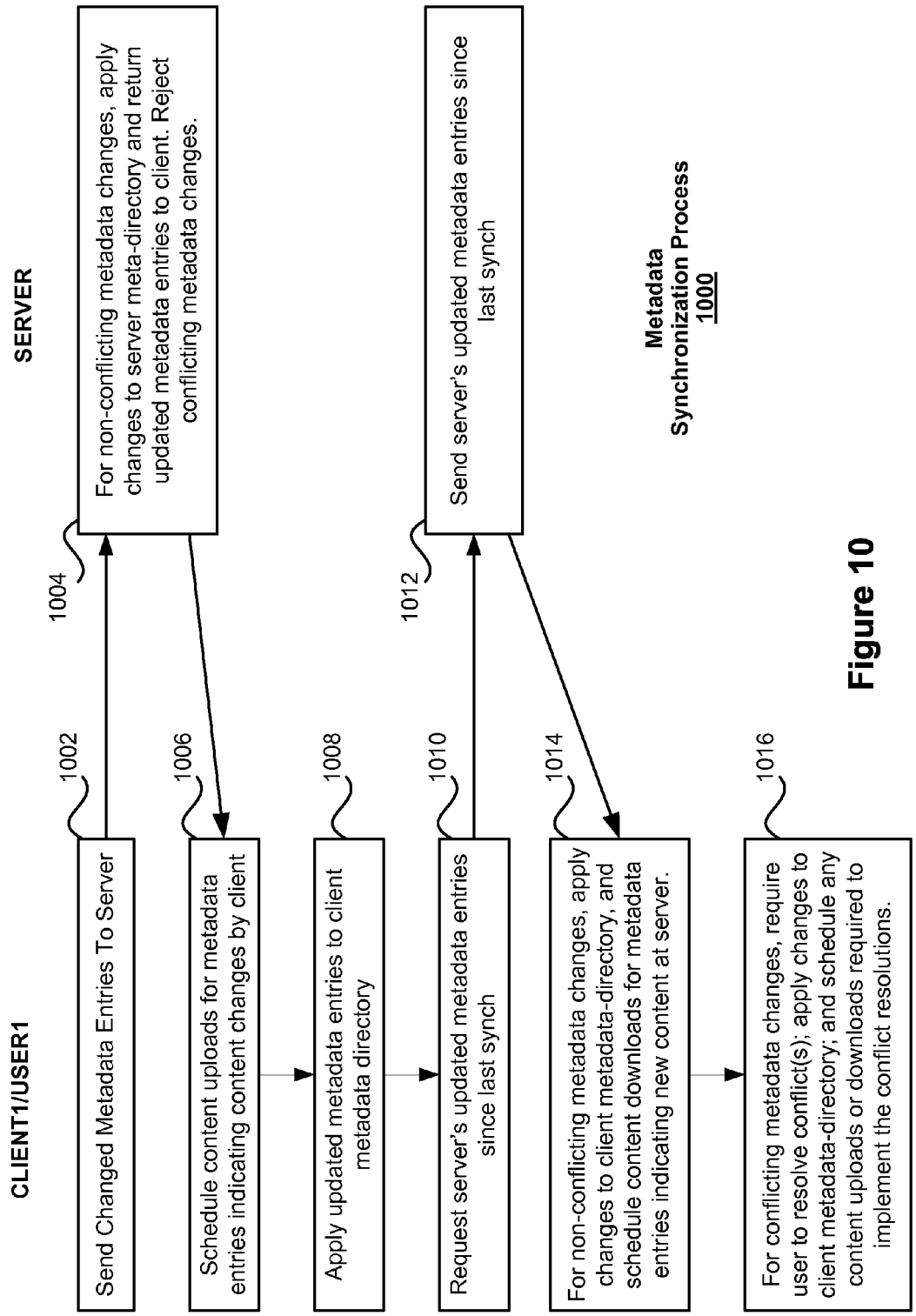
FIG. 10 is a flow diagram of an embodiment of a metadata synchronization process.

FIG. 10 is a flow diagram of an embodiment of a metadata synchronization process 1000. It is noted that a user may have access to more than one "share" on a server. The metadata synchronization process may be performed separately for each share, or it may be performed for all shares to which a user has access rights. However, since different shares may be stored on different file servers, the following explanation is directed to synchronizing the metadata for a single share. The metadata synchronization process 1000 is repeatedly performed periodically (e.g., once every N seconds, where N is in the range of 1 to 10) or episodically (e.g., in response to the occurrence of any one of a predefined set of trigger conditions). As explained in more detail below, some synchronization operations require more than one iteration of the metadata synchronization process 1000 to be completed.

In a first phase (operations 1002-1006), sometimes called the commit phase, the client system 110 sends to the server 104 all client metadata entries 114 that have been modified by the client (1002). In some embodiments, client metadata entries 114 that have been modified are marked with an IS_DIRTY flag. In some embodiments, the entire content of each changed metadata-directory entry is sent to the server 104, while in other embodiments only changed fields of the entry are sent. The server 104 receives the metadata-directory entries from the client 110, identifies any received entries that conflict with entries in the server's corresponding metadata-directory 132, and rejects the conflicting entries (i.e., the received entries that conflict with corresponding entries in the server's metadata-directory 132) (1004). In some embodiments, rejected metadata entries are not processed and thus their changed fields are not applied to the corresponding entries in the server's metadata-directory 132. The remaining client metadata-directory entries 114, which do not conflict with entries in the server's corresponding metadata-directory 132, are used to update the server's metadata-directory 132 (1004). For example, the updating may be performed in some embodiments by updating changed fields in existing meta-directory entries, assigning file IDs to new metadata entries, and inserting the new metadata-directory entries into the server's metadata table.

The server 104 may assign a version number to each new server metadata-directory entry and each updated server metadata-directory entry. Alternately, or in addition, it may store a timestamp in the server metadata-directory entry to indicate the date and time of the last update made to the server metadata-directory entry. The server metadata-directory entries 132 modified in response to the client metadata-directory entries 114 sent to the server 104 are sent to the client (1004). Optionally, the server 104 may also send to the client 110 information indicating which client metadata-directory entries 114 were rejected because they conflict with entries in the server's metadata-directory 132.

The client 110 processes the received server metadata-directory entries (1006, 1008). One aspect of this processing is identifying metadata-directory entries that indicate revised file content located at the client 116, and scheduling content uploads of those files to the server (1006). In some embodiments, the metadata-directory entries include a content checksum field, and an update flag for that field that indicates whether the content checksum field contains an updated value. When the upload for a file is completed, the server 104 changes its metadata entry to clear the update flag, and that update is copied to the corresponding client metadata-directory entry during a next iteration of the metadata synchronization process. Another aspect of processing the received server metadata-directory entries 132 is updating or overwriting the portion of the client metadata record 114 that holds the server metadata 306 with the information in the received server metadata entries (1008). For example, the received server metadata entries 132 may have new version numbers that need to be copied into the portion of the client metadata record 114 that holds the server metadata 306. Also, operations 1002 through 1008 synchronize updated client metadata-directory entries 304 with the corresponding server metadata-directory entries 306, excluding client metadata-directory entries 304 that have updates that conflict with server metadata-directory entries 306.

Next, in a second phase of the metadata synchronization process, sometimes called the "get updates" phase, the client 110 requests from the server 104 copies of all server metadata-directory 132 entries revised since the last metadata synchronization (1010). As noted above, in some embodiments, each metadata-directory entry includes a timestamp (synch_ts) indicating the last time the entry was changed on the server 104. The server 104 identifies and sends to the client 110 the requested server metadata-directory entries (1012). For ease of explanation, separate discussions are provided for the handling of server metadata-directory entries 132 that do not conflict with client metadata-directory entries and for the handling of those server metadata-directory entries 132 that do conflict with client metadata-directory entries 114. It may be noted that the server metadata-directory entries 132 sent to the client at (1012) include server metadata-directory entries 132 corresponding to any client metadata-directory 114 entries rejected by the server at (1004) due to conflicting updates.

When a received server metadata-directory entry 132 does not conflict with any corresponding client metadata-directory entries 114 (i.e., entries having the same file ID and/or the same filename), the metadata changes in the server metadata-directory entry 132 are written in the portion of the client metadata record 114 that holds the server metadata 306 and the client metadata 304. When there is no corresponding client metadata-directory record 302, a new client metadata-directory record 302 is generated. In addition, if the server metadata-directory entry indicates revised file content located at the server 134, the client 110 schedules a content download of the file content from the server (1014).

When a received server metadata-directory entry 132 conflicts with one or more corresponding client metadata-directory entries 114 (i.e., entries having the same file ID and/or the same filename), the process requires a user to resolve the conflict (1016). In some embodiments, the user may resolve the conflict by selecting a client or server version of a file (and its metadata) as the "winner," in which case the losing file and/or its metadata will be overwritten by the winning file and/or its metadata. Alternatively, the user may rename or move the conflicting client file so as to eliminate the conflict. Changes are applied to the client metadata-directory 114 in accordance with the user specified resolution of the conflict (1016). This may include deleting or revising one or more client metadata-directory entries. In addition, the client schedules any file content uploads or downloads needed to implement the user specified resolution of the conflict (1016). For instance, when the server metadata-directory entry 132 is selected by the user as the winning entry, and that entry includes an update flag or other data that indicates that the content 134 of the corresponding server file is new or updated, a file download is scheduled. More generally, if the server metadata-directory entry 132 survives the conflict resolution process and includes an update flag or other data that indicates that the content 134 of the corresponding server file is new or updated, a file download is scheduled. On the other hand, if the conflict resolution process results in a client metadata-directory entry 114 that includes an update flag or other data that indicates that the content 116 of the corresponding client file is new or updated, a file upload will be scheduled during the next metadata synchronization cycle (i.e., when operations 1002-1006 are next performed).

If a new or updated client metadata-directory entry 114 includes a file path 320 that requires changes to the directory structure of the metadata-directory, then appropriate directory entries (sometimes called folder entries) are created, revised or deleted to reflect the revised directory structure. Similarly, if a file is moved from one directory or folder to another, those changes are reflected in the corresponding metadata-directory entries 114, and all such changes in the client metadata-directory 114 are replicated in the server metadata-directory 132 during the next metadata synchronization cycle.

Figure 11:
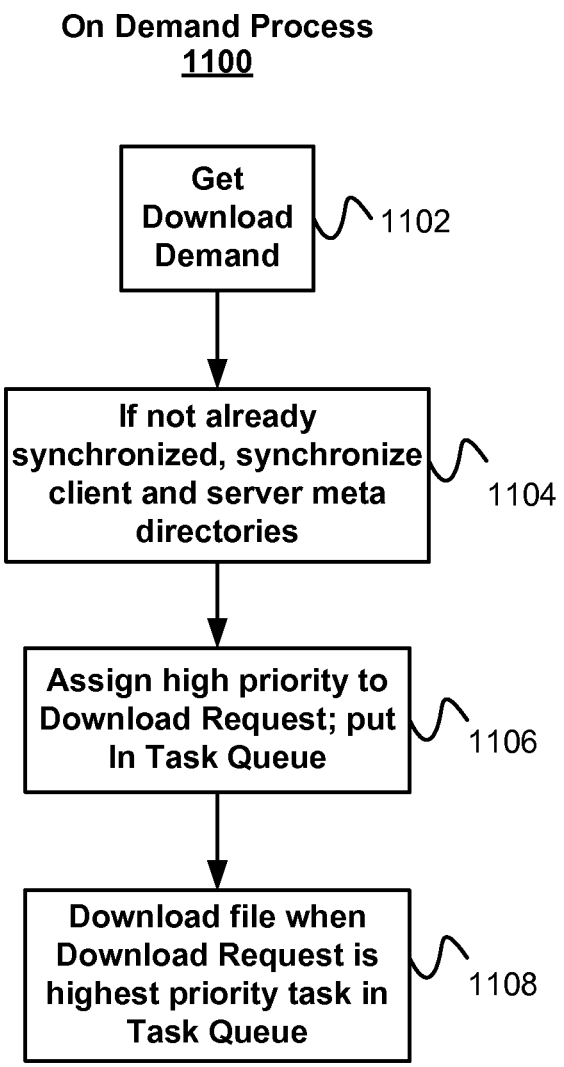
FIG. 11 is a flow diagram of one embodiment of an on-demand process flow.

FIG. 11 is a flow diagram of one embodiment of an on-demand process 1100. The on-demand process 1100 takes place on a client 110 of the file management system 100 (FIG. 1A). The on-demand process 1100 may be governed by instructions that are stored in a computer readable storage medium and that are executed by one or more processors of one or more servers. Each of the operations shown in FIG. 11 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In some embodiments, files can be downloaded from the server system 104 in response to user demand. The process 600 begins with the receipt of a download (DL) demand from the user or an application executed by a respective client (1102). The download demand may occur, for example, when the user attempts to open a file identified by a client meta-directory entry, but the file is not resident in the subset of content 117. Optionally, if the client metadata-directory 114 is not synchronized with the server metadata-directory 120 for the share in which the requested file is located, then the metadata synchronization process is executed (1104) to ensure that the client metadata-directory entry for the requested file is up to date. The download request is assigned a high priority, such as the highest possible priority in the set of priorities that can be assigned to tasks in a task queue, and is added to the task queue (1106). The requested file is downloaded from the server 104 when the corresponding download request becomes the highest priority task in the task queue (1108). In some embodiments, any lower priority task(s) that are executing at the time the download request is added to the task queue are temporarily suspended while the high priority download request is serviced.

Figure 12:
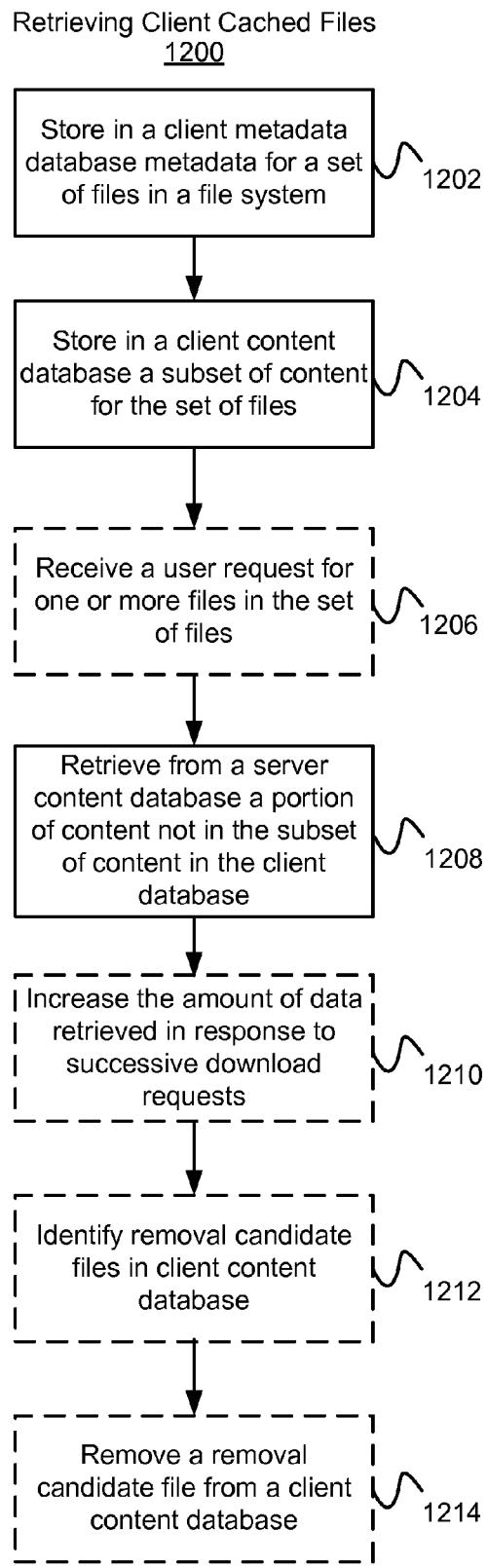
FIG. 12 is a flow diagram of one embodiment of retrieving client cached files.

FIG. 12 is a flow diagram of one embodiment of a process for downloading file content on demand 1200. The on-demand process flow 1200 takes place on a respective client 110 of a file management system 100. The on-demand process flow 1200 may be governed by instructions that are stored in a computer readable storage medium and that are executed by one or more processors of one or more servers. Each of the operations shown in FIG. 12 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The on-demand process flow 1200 is a method of storing and retrieving file content from a server 104 for files that may not be or may be only partially stored on a client 110, and comprises some or all of the following operations. The client stores (1202) in a client metadata database 114 (see FIG. 1B) metadata for a set of files 115 in a file system 100. The client also stores (1204) in a client content database 116 a subset of content 117 for the set of files in the client metadata database, wherein the subset of content 117 does not exceed a cache size that is less than a full size of the content in the set of the files. In response to a request (1206), the client retrieves (1208) from a server content database 138 and stores in the client content database 116 at least a portion of content not in the subset of content 117. Typically, the server content database is located remotely from the client device.

In some embodiments, the subset of content 117 includes at least some content for each file in the set of files. Alternately, the subset of content 117 consists of content for a subset of files of the set of files. In some embodiments, the retrieving (1208) comprises retrieving one or more discontinuous blocks of content. In some embodiments, the retrieving (1208) comprises responding to a user request by retrieving one or more blocks of information required to respond to the user request, the one or more retrieved blocks comprising less than all the content of the file. For example, if the user request is for data associated with a (user-requested) scene in the middle of a movie, then the retrieved blocks of the file will correspond to the blocks of data for the user-requested portion of the movie.

In some embodiments, receiving a user request (1206) may include a request for a plurality of files in the set files. Then responding to a user request for information concerning a plurality of files in the set files involves retrieving (1208), for each respective file of at least a subset of the plurality of files, one or more blocks of information comprising less than all of the content of the respective file. In some embodiments, the retrieving (1208) further comprises, responding to multiple download requests for successive portions of a file by increasing (1210) the amount of data retrieved from the server in response to each successive request of the multiple download requests. For example, in response to a first request for a portion of a file, the client may send to the server a request for X amount of data (e.g., 64 Kbytes); upon a second request for an additional portion of the same file, received within a predefined amount of tile (e.g., within 15 seconds), the client may send to the server a request for 2× amount of data; upon a third such request, the client may send to the server a request for 4× amount of data; and so on until a predefined maximum size request (e.g., a request of size 32×, such as 1 Mbyte of data) is sent to the server, with each subsequent request being services by sending a request of either the predefined maximum size, or a request for the remaining portion of the file if the remaining portion is less than the predefined maximum size.

In some embodiments, the method will also include identifying (1212) one or more removal candidate files, the removal candidate files including files marked as candidates for removal from the subset of content 117 in the client content database 116. In some embodiments, the method will further include, removing (1214) from the subset of content 117 in the client content database 116, content for at least one removal candidate file of a group of removal candidate files. In some embodiments, the removing (1214) comprises removing from the client content database 114 content of a least recently accessed file in the group of removal candidate files. In some embodiments, the removing (1214) comprises removing from the client content database 114 content for a largest file in the group of removal candidate files. In some embodiments, the removing (1214) comprises removing portions of content for a file in the content database, such that a smaller read-only version of the file remains.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of downloading file content on demand, performed by a client device having one or more processors and memory storing one or more programs for execution by the one or more processors, the method comprising:
at the client device:
storing in a client metadata database, metadata for a set of files in a file system;
storing in a client content database, a subset of content for the set of files for which metadata is stored in the client metadata database, wherein the subset of content does not exceed a cache size that is less than a full size of the content in the set of the files, and wherein the metadata in the client metadata database and the content in the client content database correspond to a virtual drive at the client device;
in response to a request, retrieving from a server content database and storing in the client content database, at least a portion of content not in the subset of content, wherein the server content database is on a server located remotely from the client device; and
performing a synchronization operation between the server and the client device wherein, upon completion of the synchronization operation, content stored in the client content database is a subset of a full set of content for the set of files and, upon completion of the synchronization operation, metadata stored in the client metadata database includes a full set of metadata for the set of files, wherein the subset of the full set of content does not exceed the cache size that is less than the full size of the content in the set of the files.

2. The method of claim 1, wherein the subset of content includes at least some content for each file in the set of files.

3. The method of claim 1, wherein the subset of content consists of content for only a subset of files of the set of files.

4. The method of claim 1, wherein the retrieving comprises retrieving one or more discontinuous blocks of content of a respective file.

5. The method of claim 1, wherein the retrieving comprises responding to a user request by retrieving one or more blocks of information required to respond to the user request, the one or more retrieved blocks comprising less than all the content of a respective file.

6. The method of claim 1, including responding to a user request for information concerning a plurality of files in the set files by retrieving, for each respective file of at least a subset of the plurality of files, one or more blocks of information comprising less than all of the content of the respective file.

7. The method of claim 1, wherein the retrieving further comprises, responding to multiple download requests for successive portions of a file by increasing the amount of data retrieved from the server in response to each successive request of the multiple download requests.

8. The method of claim 1, further comprising:
removing from the client content database, content for at least one removal candidate file of a group of removal candidate files.

9. The method of claim 1 further comprising:
removing from the client content database content of a least recently accessed file in the group of removal candidate files.

10. The method of claim 1, further comprising:
removing from the client content database content of a largest file in the group of removal candidate files.

11. The method of claim 1, further comprising:
removing portions of content for a file in the content database, such that a smaller read-only version of the file remains.

12. A computer-implemented client device for downloading file content on demand, comprising:
one or more processors;
memory; and
one or more programs stored in the memory for execution by the one or more processors, the one or more programs comprising instructions to:
store in a client metadata database, metadata for a set of files in a file system;
store in a client content database, a subset of content for the set of files for which metadata is stored in the client metadata database, wherein the subset of content does not exceed a cache size that is less than a full size of the content in the set of the files, and wherein the metadata in the client metadata database and the content in the client content database correspond to a virtual drive at the client device;
respond to a request by retrieving from a server content database and storing in the client content database, at least a portion of content not in the subset of content, wherein the server content database is on a server located remotely from the client device; and
perform a synchronization operation between the server and the client device wherein, upon completion of the synchronization operation, content stored in the client content database is a subset of a full set of content for the set of files and, upon completion of the synchronization operation, metadata stored in the client metadata database includes a full set of metadata for the set of files, wherein the subset of the full set of content does not exceed the cache size that is less than the full size of the content in the set of the files.

13. The computer-implemented client device of claim 12, wherein the subset of content includes at least some content for each file in the set of files.

14. The computer-implemented client device of claim 12, wherein the subset of content consists of content for only a subset of files of the set of files.

15. The computer-implemented client device of claim 12, wherein the instructions for retrieving include instructions for responding to a user request by retrieving one or more blocks of information required to respond to the user request, the one or more retrieved blocks comprising less than all the content of a respective file.

16. The computer-implemented client device of claim 12, wherein the instructions for retrieving include instructions for responding to multiple download requests for successive portions of a file by increasing the amount of data retrieved from the server in response to each successive request of the multiple download requests.

17. A non-transitory computer readable storage medium storing one or more programs configured for execution by one or more processors of a client device for downloading file content on demand, the one or more programs comprising instructions to:
store in a client metadata database, metadata for a set of files in a file system;
store in a client content database, a subset of content for the set of files for which metadata is stored in the client metadata database, wherein the subset of content does not exceed a cache size that is less than a full size of the content in the set of the files, and wherein the metadata in the client metadata database and the content in the client content database correspond to a virtual drive at the client device;

respond to a request by retrieving from a server content database and storing in the client content database, at least a portion of content not in the subset of content, wherein the server content database is on a server located remotely from the client device; and perform a synchronization operation between the server and the client device wherein,. upon completion of the synchronization operation, content stored in the client content database is a subset of a full set of content for the set of files and, upon completion of the synchronization operation, metadata stored in the client content database includes a full set of metadata for the set of files, wherein the subset of the full set of content does not exceed the cache size that is less than the full size of the content in the set of the files.

18. The computer readable storage medium of claim 17, wherein the subset of content includes at least some content for each file in the set of files.

19. The computer readable storage medium of claim 17, wherein the subset of content consists of content for only a subset of files of the set of files.

20. The computer readable storage medium of claim 17, wherein the instructions for retrieving include instructions for responding to a user request by retrieving one or more blocks of information required to respond to the user request, the one or more retrieved blocks comprising less than all the content of a respective file.

21. The computer readable storage medium of claim 17, wherein the instructions for retrieving include instructions for responding to multiple download requests for successive portions of a file by increasing the amount of data retrieved from the server in response to each successive request of the multiple download requests.

* * * * *